United States Patent
Aldrich et al.

(10) Patent No.: US 8,564,680 B1
(45) Date of Patent: Oct. 22, 2013

(54) METHOD AND APPARATUS FOR NOISE MANAGEMENT FOR COLOR DATA SYNTHESIS IN DIGITAL IMAGE AND VIDEO CAPTURE SYSTEMS

(75) Inventors: Bradley C. Aldrich, Austin, TX (US); Thomas Hartin, Austin, TX (US); Adam George, Austin, TX (US)

(73) Assignee: Marvell International Ltd., Hamilton (BM)

( * ) Notice: Subject to any disclaimer, the term of this patent is extended or adjusted under 35 U.S.C. 154(b) by 926 days.

(21) Appl. No.: 12/327,192

(22) Filed: Dec. 3, 2008

Related U.S. Application Data

(60) Provisional application No. 61/013,505, filed on Dec. 13, 2007, provisional application No. 61/046,686, filed on Apr. 21, 2008.

(51) Int. Cl.
*H04N 5/228* (2006.01)
*H04N 3/14* (2006.01)
*G06K 9/36* (2006.01)

(52) U.S. Cl.
USPC ............... 348/222.1; 348/272; 382/167

(58) Field of Classification Search
USPC ............... 348/222.1, 273; 382/165, 167
See application file for complete search history.

(56) References Cited

U.S. PATENT DOCUMENTS

2003/0164886 A1* 9/2003 Chen .................. 348/272
2004/0161145 A1* 8/2004 Embler ................ 382/165
2006/0245646 A1* 11/2006 Ishiga ................. 382/167

* cited by examiner

*Primary Examiner* — Roberto Velez
*Assistant Examiner* — Joel Fosselman

(57) ABSTRACT

Systems and methods for synthesizing color data. The method includes calculating gradients at a plurality of angles with respect to a generation point in a matrix of color data, performing a first-level edge test by comparing each of the gradients to a noise threshold, selecting an interpolation technique in response to the comparisons, and synthesizing missing color data at said generation point using the selected interpolation technique.

16 Claims, 15 Drawing Sheets

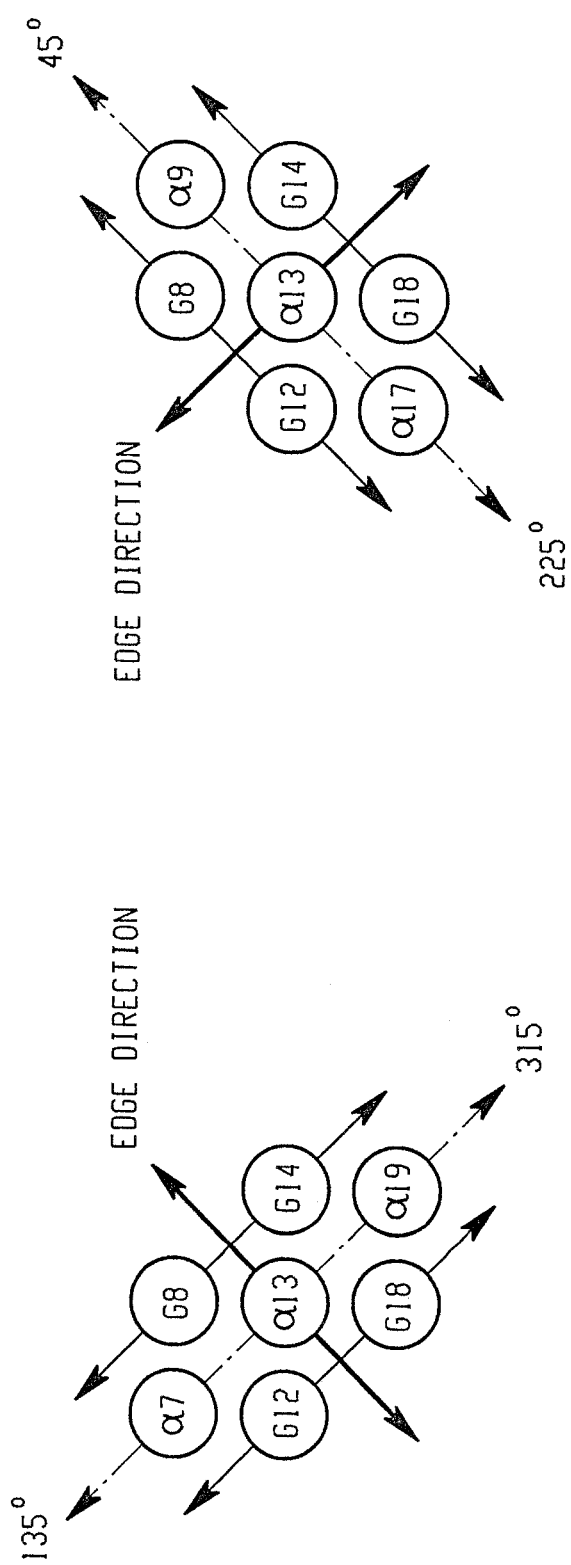

METHOD AND APPARATUS FOR NOISE MANAGEMENT FOR COLOR DATA SYNTHESIS IN DIGITAL IMAGE AND VIDEO CAPTURE SYSTEMS

CROSS-REFERENCE TO RELATED APPLICATIONS

The present application claims priority from U.S. Provisional Application Ser. No. 61/013,505 entitled "Method and Apparatus for Noise Management for Spatial Processing in Digital Image/Video Capture Systems," filed 13 Dec. 2007, and U.S. Provisional Application Ser. No. 61/046,686 entitled "Gradient Vector Color Synthesis Algorithm Performance Evaluation," filed 21 Apr. 2008, the entirety of which are hereby incorporated by reference for all purposes.

FIELD

This disclosure is related generally to methods for synthesizing color data for arrays in which each color is not individually measured at each spatial location.

BACKGROUND

Modern color CCD and CMOS image sensors use a mosaic of color filter array, (CFA), material over a 2D array of photo detectors. This allows visible light centered on the wavelengths associated with visible light humans perceive as red, green, and blue to be measured. Instead of three separate N×M arrays for each of the colors, a single array with a mosaic pattern of CFA materials is used. Some positions in the array measure the green signal and others the red and blue. For each (x,y) position in the array, two of the three components needed for a 24-bit RGB spatial location are missing. The Bayer pattern and synthesized 24-bit color is illustrated in FIG. 15.

Color synthesis or "demosaicing" techniques exist at the heart of the RAW camera processing sequence. The techniques, if designed well, are robust in the presence of a wide variety of scene content, and if designed poorly, they are often considered the root cause of annoying and undesirable artifacts. The literature is full of techniques developed with varying levels of complexity over the past 10-15 years.

Color data synthesis techniques are designed to generate the missing red, green, and blue data components of a color image. This effectively allows three N×M arrays to be generated from a single N×M input array as shown in FIG. 15. The Bayer pattern CFA is one of the most popular formats for digital color imaging. A green filter material is applied to half of the array by interleaving it with red and blue material. For an array size of N×M, there are a total of N×/2 green elements, and N×M/4 elements each for the red and blue channels. The synthesis of the missing color data components at each location in the array may be accomplished using both standard and proprietary techniques. In general, the techniques will display varying degrees of both complexity and visual quality. Depending on the intended purpose, both low and high complexity techniques may be used in an image capture system. The simplest techniques display a well-structured sequence of operations using a fixed access or filtering pattern for every spatial location. The more complex techniques often include an adaptation scheme based on some measured image parameter. Because artifacts tend to occur more often around edges, edge-based adaptation is fairly common and can yield drastic improvements in visual quality. However, using edge strength for adaptive control can require significant computational overhead.

Color data synthesis is the point in a RAW processing sequence where the raw Bayer sampled data is converted to the well-known RGB triads processed by other aspects of the image/video display and compression systems. It is the point in the processing where there is no return, and failure to deliver the optimum result can only be mitigated by downstream processing steps. Thus, it would be desirable, when synthesizing RGB color data from the raw Bayer CFA data to minimize edge artifacts and minimize aliasing artifacts. It would also be desirable to identify regions which are homogeneous and that contain structure which is related to "texture."

SUMMARY

One embodiment of the present disclosure is directed to a method of synthesizing color data through the use of what is called a gradient vector synthesis method (GVS or the disclosed method). The disclosed method is comprised of calculating gradients at, for example, 0°, 45°, 90°, and 135° with respect to a generation point in a matrix of raw color data. A first-level edge test is performed by comparing each of the gradients to a noise threshold. An interpolation technique (referred to as a kernel) is selected in response to the comparison. The selected kernel is used to synthesize the missing color data at the generation point.

The comparison of the four gradients to one or more noise thresholds results in the generation of a four-element boolean code word indicating whether each of the gradients at 0°, 45°, 90°, and 135° is above or below the noise threshold. The threshold(s) may be individually programmable. The boolean code word may be used to select an interpolation kernel from a table.

If the raw color data at the generation point is red data, the method may be performed to first synthesize missing blue data and then the method may be repeated to synthesize missing green data for the generation point. If the raw color data at the generation point is blue data, the method may be performed to first synthesize missing red data and then the method may be repeated to synthesize missing green data for the generation point. However, the order of synthesis is not critical, and in certain cases, synthesis of missing color data may be carried out in parallel.

The disclosed method may incorporate a second-level edge test. For example, if the first-level edge test indicates that an edge may exist along the diagonals (45° and 135°), then a second-level edge test may be performed to refine the direction of the edge (i.e., to more clearly identify the direction along which an edge may be found). The interpolation kernel finally selected in response to the refinement provides for a better synthesis of the missing color data.

In certain circumstances it may be desirable to presynthesize missing vertical neighbor color data or missing horizontal neighbor color data with respect to the generation point. The presynthesizing step may be comprised of performing the disclosed GVS method, followed by a repeated application of the GVS method, to perform the synthesis of the missing color data. Presynthesis will be advantageous in circumstances such as:

generating missing vertical neighbor red color data when synthesizing missing red color data at a generation point on a red/green row having raw green color data;

generating missing horizontal neighbor blue color data when synthesizing missing blue color data at a generation point on a red/green row having raw green color data;

generating missing vertical neighbor blue color data when synthesizing missing blue color data at a generation point on a blue/green row having raw green color data; and generating missing horizontal neighbor red color data when synthesizing missing red color data at a generation point on a blue/green row having raw green color data.

Another embodiment of the disclosed method begins by determining the color data at the generation point so that the color data may be generated in a particular sequence. If a generation point in a matrix of raw color data contains red/blue color data, the blue/red color data is synthesized first, and then the green color data is synthesized for the generation point. The method of synthesizing is the same as disclosed above. More particularly, the method is comprised of calculating gradients at, for example, 0°, 45°, 90°, and 135° with respect to a generation point in the matrix; performing a first-level edge test by comparing each of the gradients to a noise threshold; selecting an interpolation technique in response to the comparing; and synthesizing the missing color data at the generation point using said selected interpolation technique.

A system for performing the various embodiments of the disclosed method is also disclosed. By calculating and analyzing the gradients at the diagonals with respect to a generation point, more information is learned about the generation point and more accurate color data can be generated. Other advantages and benefits will be apparent from the following description herein below.

BRIEF DESCRIPTION OF THE DRAWINGS

For the present disclosure to be easily understood and readily practiced, the present disclosure will now be described, for purposes of illustration and not limitation, in conjunction with the following figures.

FIG. 4 illustrates the angles measured at generation points used for measurement of edge strength (the possibility of the presence of an edge) for the first-level edge test.

FIG. 7 illustrates the case when green color data is being synthesized at a location at which red or blue color data is sensed or measured, and the first-level test indicates that an edge may be present along the 45° diagonal (FIG. 7A) or along the 135° diagonal (FIG. 7B).

DETAILED DESCRIPTION

Figure 1:
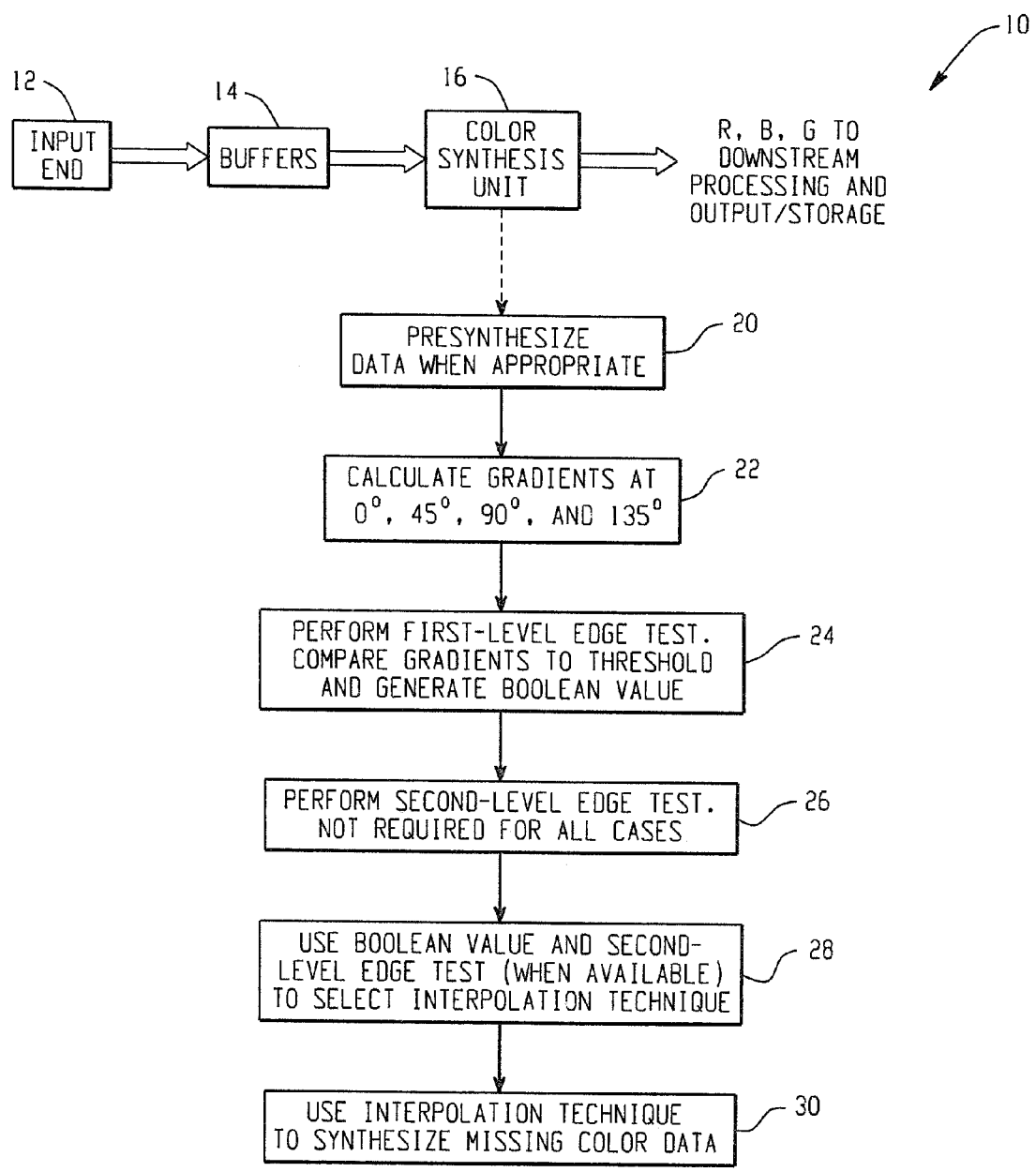
FIG. 1 is a high-level block diagram of a system for implementing the disclosed method of color data synthesis, and an outline of the disclosed method of color data synthesis.

In FIG. 1, a device 10 is illustrated for capturing digital images or video. The device may take many forms from a dedicated camera to a cell phone, to name two. The present method is not limited by the type of device in which it is implemented. The device 10 is comprised of an input end 12 which may be comprised of optics and a color filter array producing red, blue, and green raw color data as discussed above. After the raw data is buffered by buffers 14, the data is processed by a color synthesis unit 16. The color synthesis unit 16 is configured to implement a gradient vector synthesis method of the present disclosure as shown in the outline of FIG. 1. The unit 16 includes resources to address different aspects associated with the performance of the gradient vector synthesis method. The unit 16 is supplied data in the Bayer format. The buffers 14 can present, for example, a 5×5 region (sometimes referred to as a frame, window, or matrix) within the 2D array to enable spatial processing by the unit 16 which may be operating in a sliding window fashion in a row-major approach to the 2D calculation. The result of the execution of operations on each 5×5 matrix of Bayer data is three data values. The first is the true sensed color at that spatial location. The second and third are the synthesized colors representing the missing channel data at the same spatial location. For example when a generation point (x,y) has sensed green color data, the blue color data and red color data are synthesized. Similarly, if a generation point (x,y) has existing sensed red color data or blue color data, the missing green color data and the missing blue or red color data, respectively, are synthesized. The red, blue, and green color data are made available for further downstream processing (not shown) and eventual storage/output of an image. Although the unit 16 is shown as a separate component, it may be integrated with certain of the downstream processing. The method of the present invention, described next in outline form, is not to be limited by the manner in which it is executed.

The method may begin with step 20 with the presynthesis of data when appropriate. Presynthesis of data is appropriate when, for example, you need to synthesize red or blue color data from a generation point that has sensed green color data. At step 22, gradients are calculated at, for example, 0° (horizontal), 90° (vertical), and two diagonals (45° and 135°) with respect to a generation point in a matrix of sensed color data. At step 24, a first-level edge test is performed by comparing the gradients to a threshold based on channel noise. This comparison produces a boolean code word. If the first-level edge test indicates that an edge may be present on the diagonals, a second-level edge test is performed at step 26. At step 28 the results of the first-level and second-level edge tests (if performed) are used to select an interpolation technique. The selected technique is used at step 30 to synthesis the missing data. The method is repeatedly used to calculate the missing color data at various generation points.

The disclosed method is an edge adaptive method which is applied to determine the best direction for interpolation. The following sections provide a detailed description of the disclosed method as it is applied to the Bayer pattern synthesis of: green color data at red/blue generation points, red/blue color data at blue/red generation points, and red/blue color data at green generation points. There are eight classes of color data synthesis operations to be performed. Table 1, "Types of Color Synthesis Operations for the Bayer Mosaic" describes the eight cases of color data synthesis. The disclosed method generates the missing color data at each spatial location within the image array for each of the eight different cases.

TABLE 1

Types of Color Synthesis Operations for the Bayer Mosaic

| Type | Color Data to be Synthesized | Color Data at Generation Point | Row Type | Comment |
|---|---|---|---|---|
| 1 | Green | Red | RGRGR . . . | Edge Adaptive |
| 2 | Green | Blue | GBGBG . . . | Edge Adaptive |
| 3 | Red | Green | RGRGRG . . . | Edge Adaptive |
| 4 | Red | Green | BGBGBG . . . | Edge Adaptive |
| 5 | Red | Blue | BGBGBG . . . | Edge Adaptive |
| 6 | Blue | Green | BGBGBG . . . | Edge Adaptive |
| 7 | Blue | Red | RGRGRG . . . | Edge Adaptive |
| 8 | Blue | Green | RGRGRG . . . | Edge Adaptive |

Figure 2:
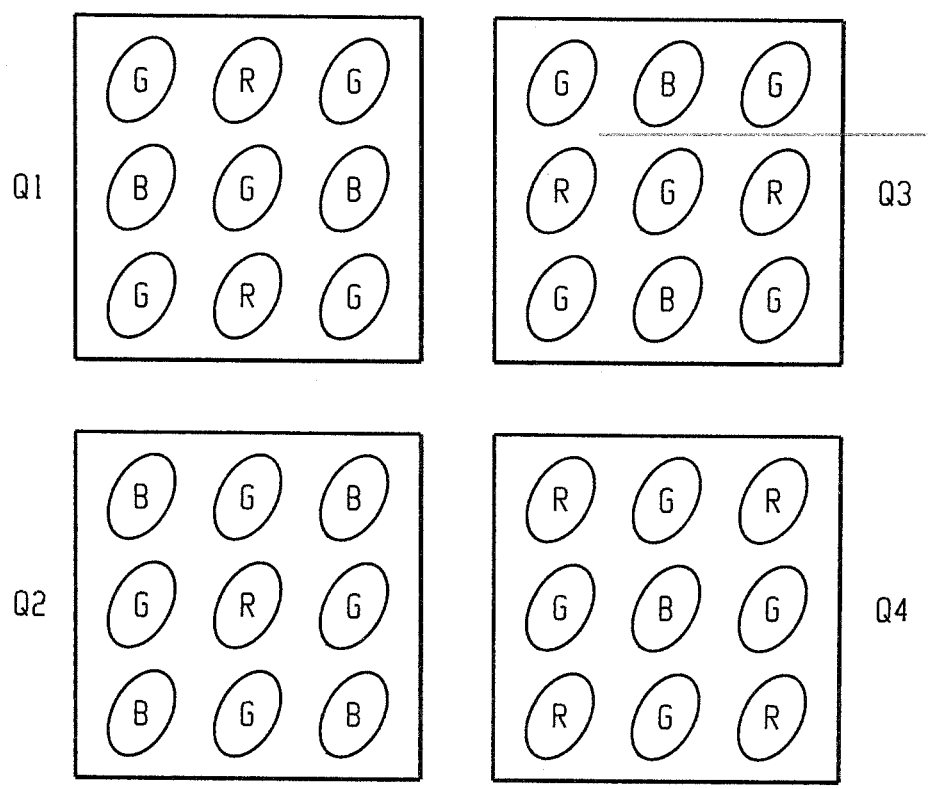
FIG. 2 illustrates four different types of quads (Q1, Q2, Q3, Q4) and the color data in each generated using the disclosed method of color data synthesis.

Turning now to FIG. 2, the Bayer mosaic pattern defines two cases for green color data. The first case is where green color data already exists at a spatial location (Q1, Q3), and the second case is where red or blue color data is present (Q2, Q4). The disclosed synthesis method follows an edge-adaptive, gradient-compensated bilinear interpolation approach for all spatial locations. The synthesis method may utilize a 5×5 matrix. Both input and output data may be at, for example, 10- or 12-bit precision. In the present implementation, the edge adaptation uses comparisons of horizontal and vertical edge strength and programmable thresholds for adaptation to sensor noise. Software implementing the disclosed method can program the following:

Noise threshold for edge determination during color synthesis at 12-bit precision: REPTH, GEPTH, BEPTH;

Noise thresholds for green channel synthesis at red and blue locations at 12-bit precision: GTR0, GTR1, GTB0, GTB1;

Noise thresholds for channel synthesis at green and blue locations at 12-bit precision: RTG0, RTG1, RTG2, RTG3, RTB0, RTB1;

Noise thresholds for blue channel synthesis at green and red locations at 12-bit precision: BTG0, BTG1, BTG2, BTG3, BTR0, BTR1;

Scale factor for signal-level adaptation supporting either a scale by 4, 8, 16, or 32: SF;

Signal-level Adaptation Enable: SLA_EN;

Bit precision of Bayer data either 10-bit or 12-bit: BIT_PREC; and

Enable for the color synthesis module: CS_EN.

The following sections describe the disclosed method as applied to the generation of green color data at red/blue generation points, the generation of red/blue color data at green generation points, and also the generation of red/blue color data at blue/red generation points.

Ordered GVS Method

Figure 3:
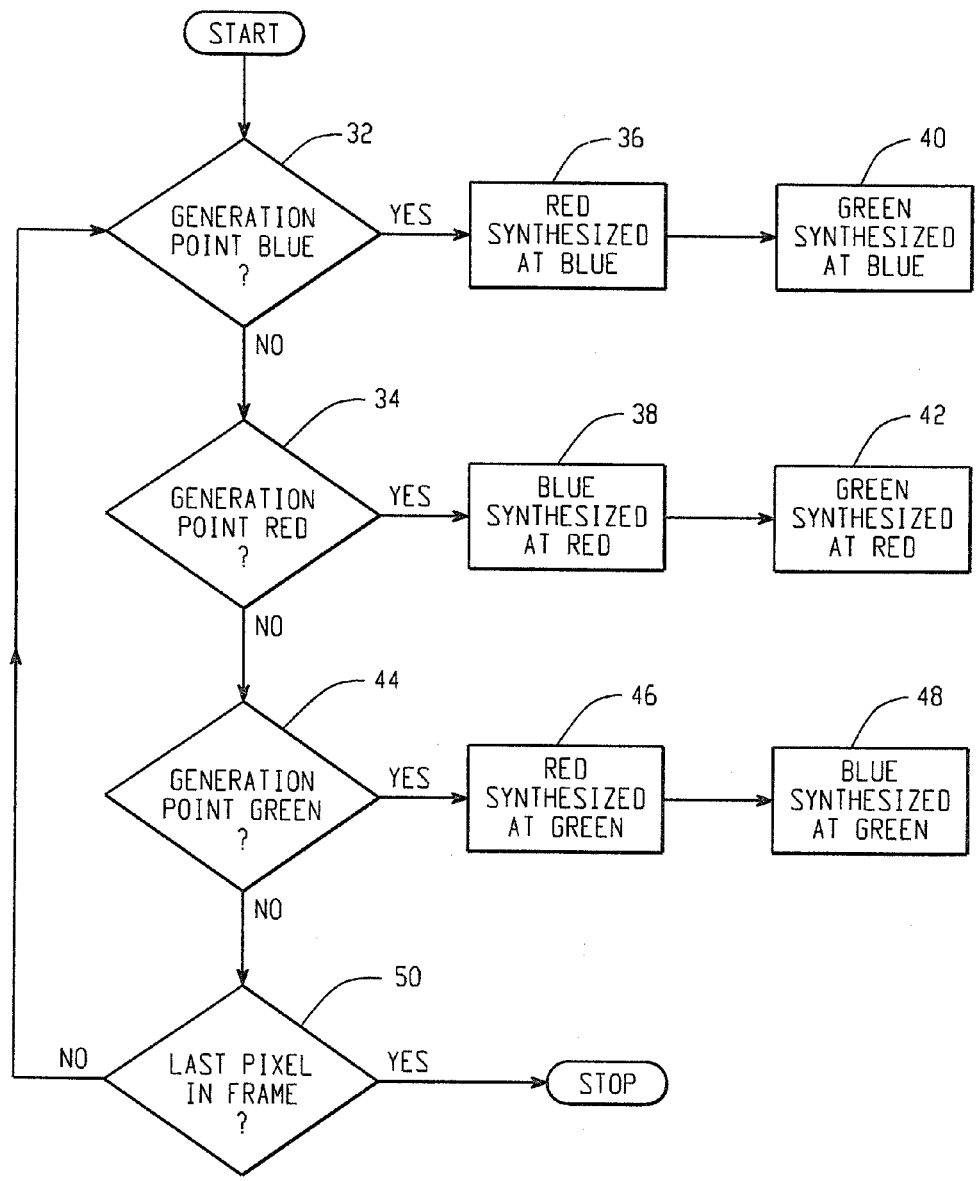
FIG. 3 is a block diagram illustrating the sequence or order in which the disclosed method is repeatedly performed depending on the sensed data at the generation point.

To maximize the preservation of scene detail, a particular synthesis order, illustrated in FIG. 3, is preferably followed. In FIG. 3, decision steps 32 and 34 determine if the generation point contains sensed blue or red color data, respectively. The missing red or blue color data is synthesized first at steps 36 and 38, respectively, to allow the maximum detail to be transferred into the green channel (green color data), which is synthesized last at steps 40 and 42, respectively. The blue before red or red before blue order is not important.

At decision step 44, a generation point having sensed green color data is identified. The red color data is synthesized at step 46, and the blue color data is synthesized at step 48, although that order is not important. Because there is twice as much green color data as red or blue color data, the horizontal/vertical neighbor color data are presynthesized to improve the accuracy of the interpolation. The presynthesizing comprises at least one of the following:

generating missing vertical neighbor red color data when synthesizing missing red color data at a generation point on a red/green row having raw green color data;

generating missing horizontal neighbor blue color data when synthesizing missing blue color data at a generation point on a red/green row having raw green color data;

generating missing vertical neighbor blue color data when synthesizing missing blue color data at a generation point on a blue/green row having raw green color data; and generating missing horizontal neighbor red color data when synthesizing missing red color data at a generation point on a blue/green row having raw green color data.

The process ends at step 50 when a determination is made that data for the last pixel in the matrix has been processed. All of the synthesizing and presynthesizing is performed using the method as outlined in FIG. 1 comprising the steps 22, 24, 26, 28, and 30.

Gradient Edge Vector

Figure 4B:
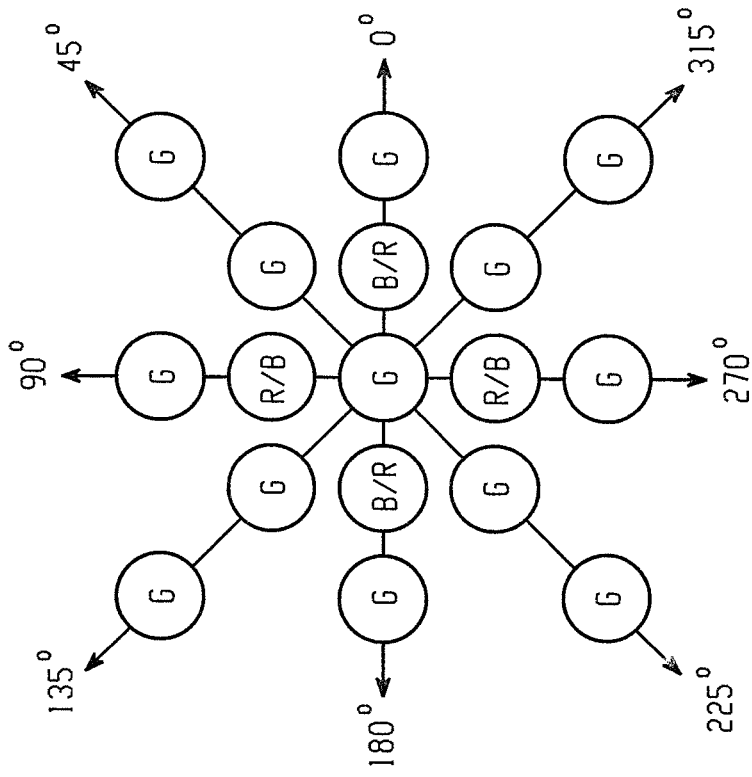
FIG. 4B illustrates the color data at the angles when the generation point has green sensed data.
Figure 4A:
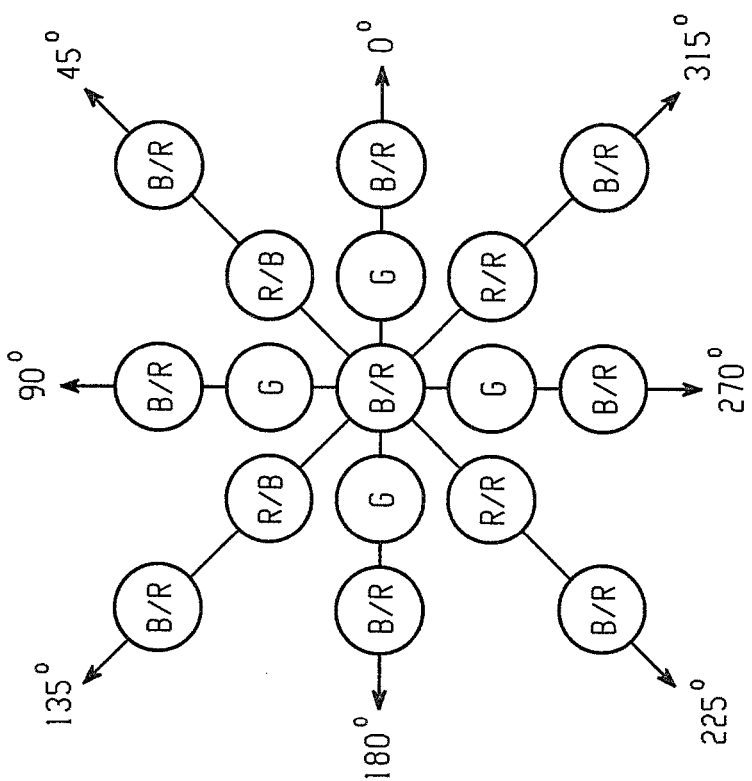
FIG. 4A illustrates the color data at the angles when the generation point has blue/red sensed data.

The disclosed method uses a two-level edge discrimination technique. At the first level, gradients at 0° (horizontal), 90° (vertical), and two diagonals (45° and 135°) are calculated with respect to a generation point in a matrix of color data. The gradients are compared against channel noise thresholds to provide an indication of edge strength (the possibility of the presence of an edge) at 0° (horizontal), 90° (vertical), or on one of the two diagonals (45° and 135°). A second-level test is a refinement step which verifies the best interpolation direction for detected angles at 45° and 135°. FIG. 4A illustrates the color data at the angles when the generation point has blue/red sensed data; FIG. 4B illustrates the color data at the angles when the generation point has green sensed data.

The gradient calculation in each of the directions is based off of cross-channel measurements which vary depending on the color data at the generation point. In the sections that follow in which the synthesis of green, red, and blue color data is described, the gradient calculations are described in detail. Following the gradient calculation at angles 0°, 90°, 45°, and 135° a comparison is performed to determine if the gradient is above the edge/noise threshold. The result of the comparison is boolean and can either be true or false. Table 2 illustrates how a boolean code word results from comparison of the gradients to noise thresholds.

TABLE 2

| Edge Measure | Comparison Operation | True | False |
|---|---|---|---|
| D0° | Gradient measure at 0 degrees > GTT | E | N |
| D90° | Gradient measure at 90 degrees > GTT | E | N |
| D45° | Gradient measure at 45 degrees > GTT | E | N |
| D135° | Gradient measure at 135 degrees > GTT | E | N |

The combination of the four comparisons forms a code word which is used to select the best interpolation kernel. The four-element boolean code word, where E represents success against the noise threshold and N represents failure is formed by:

[D0°.D90°.D45°.D135°]

For example, if all four gradients are larger than the threshold, then the four-element boolean code word is EEEE.

The edge threshold GTT is related to a combination of the noise levels for each of the channels and may be formed as the summation of the appropriate levels as described below. The edge thresholds GTT should also be adapted to the signal level because the noise increases as the signal level increases and should also vary as a function of the spatial gain applied through the vignetting correction. The following section describes the formation of the edge/noise thresholds GTT.

Noise and Edge-Adaptive System

The color synthesis unit 16 is able to accurately identify the presence or absence of edges in the 0°, 90°, 45°, and 135° directions. The gradients calculated during the disclosed method are based off of the combination of the differences between color data surrounding the generation point. The noise levels are channel dependent and, in one embodiment, vary as a function of the vignetting correction applied to the Bayer data, the front end tone curves, and also the magnitude of the signal itself.

Base Noise Thresholds

The base noise thresholds are based off of the combination of the noise thresholds for the red, green, and blue channels. A typical setting would involve the addition of the noise levels for the channels involved in the gradient calculation. For example, if the green, blue, and red channel noise levels are identified as Gthr, Bthr, and Rthr, respectively, the gradient calculation will be a combination of the channel noise thresholds because a cross-channel edge detection scheme is employed. In the current implementation, there are a total of 16 noise edge thresholds which are programmable at 12-bit precision for each of the eight synthesis classifications. Table 3 describes the thresholds for each of the four edge measures (gradients) depending on the type of color data being synthesized and the color data of the generation point.

TABLE 3

| | Cross Channel Noise Thresholds | | | | | |
|---|---|---|---|---|---|---|
| Edge | Red | | Green | | Blue | |
| Measure | on G | on B | on R | on B | on G | on R |
| D0° | RTG0 | RTB0 | GTR0 | GTB0 | BTG0 | BTR0 |
| D90° | RTG1 | | | | BTG1 | |
| D45° | RTG2 | RTB1 | GTR1 | GTB1 | BTG2 | BTR1 |
| D135° | RTG3 | | | | BTG3 | |

In addition to the 16 edge thresholds described, the individual channel noise thresholds are also utilized for the second-level edge test. In the current implementation, each of the channel edge/noise thresholds are also programmable at 12-bit precision and are represented by GEPTH, REPTH, and BEPTH in the current implementation.

Signal-Level Adaptation

Figure 5:
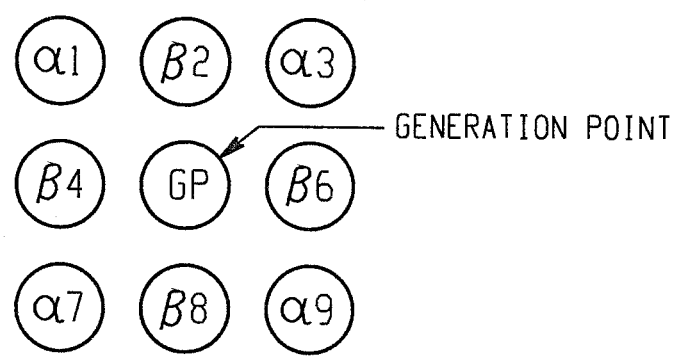
FIG. 5 illustrates the neighbors of the generation point that are used for signal-level noise threshold adaptation.

Signal-level adaptation is related to the presence of photon shot noise. As the signal level increases, the contribution due to shot noise impairs the ability to accurately define an edge or a homogeneous region within the image during the synthesis of color data. The final threshold used for determining if an edge is present in each of the measured directions is calculated from the sum of the appropriate base threshold and a scaled value of the local mean. The four neighbors of the generation point are used for the signal-level adaptation. FIG. 5 illustrates the neighbors used for the signal-level adaptation.

The first-level edge thresholds are calculated as follows:

$$GTT = \frac{LocM(chan)}{SF} + \alpha T \beta i$$

where chan is G, R, or B; SF represents a scale factor which allows an adaptation mechanism based on local signal level; i is 0, 1, 2, or 3; $\beta$, $\alpha$ is either R, G, or B depending on the sensed color data at the generation point. In a similar fashion the second-level threshold and some of the presynthesized color data are calculated by the summation of the local mean and the channel noise thresholds, GEPTH, REPTH, or BEPTH.

$$GTT = \frac{LocM(chan)}{SF} + \beta EPTH$$

where chan is G, R, or B; SF represents a scale factor which allows an adaptation mechanism based on local signal level; and $\beta$ is either R, G, or B depending on the sensed color data at the generation point. In both of these equations, the local mean is calculated as the average of the four neighbors at 45° and 135° or at 0° and 90°.

LocM(chan)) = (α1+α3+α7+α9)/4

LocM(chan)) = (β2+β4+β6+β8)/4

In the current implementation, in both of the equations for calculating the adaptive threshold GTT, the scale factor is limited to powers of two. The scale factor may be set to 4, 8, 16, or 32. During synthesis, the GTT value is compared to the edge gradient measurements. The signal-level adaptation may also be turned off allowing only the base-level thresholds to be used.

Arithmetic Considerations for Color Data Synthesis

The disclosed method involves several arithmetic steps including the calculation of directional gradients, the calculation of the noise thresholds, the presynthesis of neighboring color data to the generation point, and the synthesis of the color data which compose the final image. In each of these steps the precision of the calculation should be maintained to avoid artifacts and maximize the noise minimization aspects of the method.

Calculation of Cross-Channel Gradients

In the current implementation the gradients may include the absolute value of a single data value difference, or the sum of the absolute value of a data value difference with the absolute value of a Laplacian cross-channel term as shown in the following cases.

CASE 1: Difference between two data values:

$$abs(A-B)$$

CASE 2: Absolute value of the Laplacian:

$$abs(A-2B+C)$$

CASE 3: Addition of Case 1 and Case 2:

$$abs(A-B)+abs(A-2B+C)$$

The calculation of the final gradient is always an unsigned number with a maximum bit depth defined by the precision of the incoming color data. All calculations should maintain sufficient precision to support subsequent processing.

Synthesis and Presynthesis

Both the synthesis and presynthesis of data use cross-channel gradients to improve the accuracy of the synthesized/generated color data. In some cases, a simple average is used, and in other cases, a gradient correction term is subtracted from an average of color data from two or four locations. In all cases, in the current implementation, the final value is rounded to the nearest integer and clamped in the range of the bit precision of the incoming color data. For example, a 10-bit RAW Bayer input format would require all synthesized color data to be clamped in the range [0, 1023]. Similarly, for a 12-bit precision, all synthesized color data will be clamped in the range [0, 4095]. The rounding technique employed in the bit precision reduction is biased, or rounded. For all averages and final precision reduction a constant is added equal to half the least significant bit of the output, followed by truncation of the lower bits. For example, the average of four 10-bit operands would yield a Q10.2 unsigned fractional integer. The constant 0x2 would be added to the 12-bit number prior to truncation of the two LSBs yielding a Q10.0 unsigned integer.

Generation of Green Color Data at Locations Having Red/Blue Color Data

The generation of green color data at generation points have red/blue sensed color data is based on a 5×5 window of red, green, and blue color data in the Bayer pattern. When synthesizing green data at a location having red or blue color data, the missing blue or red color data is determined in the presynthesis step (step 20 in FIG. 1) prior to engaging the green color data synthesis. Higher accuracy in the green channel is possible through the ordered synthesis scheme discussed in conjunction with FIG. 3 because the green channel contributes the most to the luminance and thus the perceived sharpness of the image. In addition, if higher accuracy is achieved in the green channel, it allows edge enhancement be applied with fewer artifacts. The four steps used for synthesizing the green color data are the same four steps previously described: computation of on-angle cross-channel gradients at 0°, 45°, 90°, and 135°; comparing the cross-channel gradients against an edge/noise threshold to produce a boolean code word; use of the boolean code word to select an interpolation kernel; and using the interpolation kernel to synthesize the missing color data.

Figure 6B:
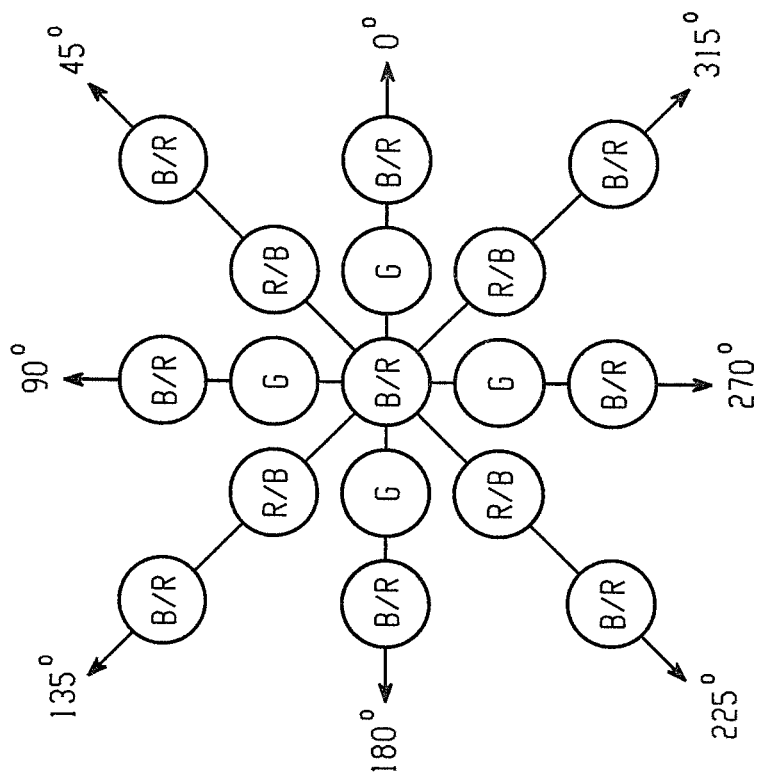
FIG. 6B illustrates the color data used to calculate cross-channel gradients produced from the matrix of FIG. 6A at the angles at 0°, 45°, 90°, and 135°.
Figure 6A:
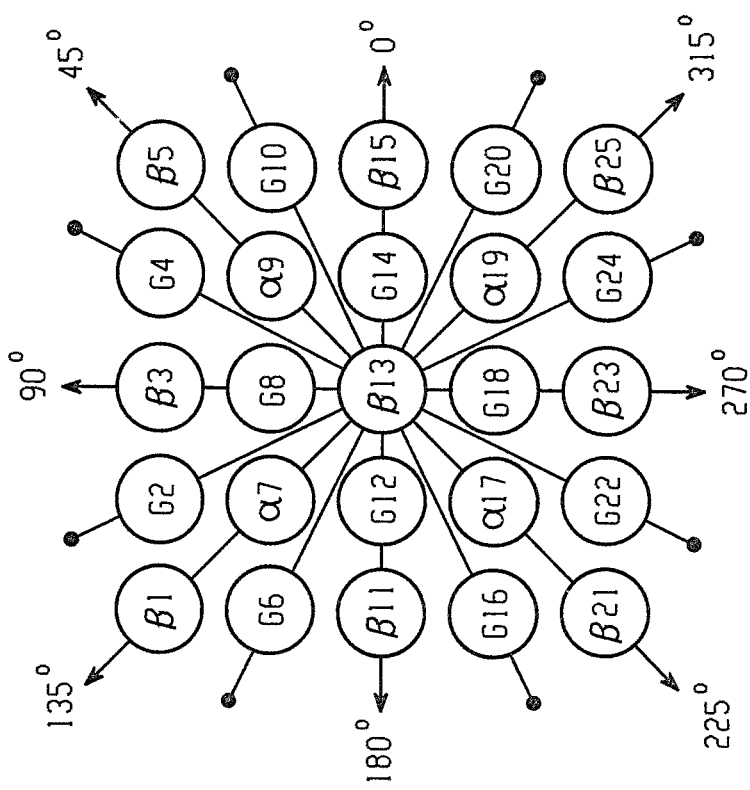
FIG. 6A illustrates a 5×5 window (frame or matrix) surrounding a location which is a generation point at which either blue or red color data has been sensed or measured.

FIG. 6A illustrates a 5×5 window (frame or matrix) surrounding a location which is a generation point at which either blue or red color data has been sensed or measured and FIG. 6B illustrates the color data used to calculate cross-channel gradients produced from the matrix of FIG. 6A at the angles at 0°, 45°, 90°, and 135°. The color data are numbered 1 to 25, and the pattern of red and blue alternates between sensed locations for the green color data synthesis. It is apparent that it may be abstracted. For example, on a red/green row there will be a total of 9 locations with red color data, 12 locations with green color data, and 4 locations with blue color data. Similarly, on a green/blue row there will be 9 locations with blue color data, 12 locations with green color data, and 4 locations with red color data.

Green Channel Edge Discrimination

The equations (edge calculations) for the calculation of the cross-channel gradients (edge measures) used when green color data is being synthesized at locations having red or blue raw color data are provided in Table 4.

TABLE 4

| Edge Measure | Edge Calculation | GTT Adaptive Threshold |
|---|---|---|
| D0° | $abs(G12 - G14) + abs(\beta11 - 2 * \beta13 + \beta15)$ | $(G8 + G12 + G14 + G18)/SF + GT\beta0$ |
| D90° | $abs(G8 - G18) + abs(\beta3 - 2 * \beta13 + \beta23)$ | |
| D45° | $abs(\alpha9 - \alpha17) + abs(\beta21 - 2 * \beta13 + \beta5)$ | $(\alpha9 + \alpha17 + \alpha7 + \alpha19)/SF + GT\beta1$ |
| D135° | $abs(\alpha7 - \alpha19) + abs(\beta1 - 2 * \beta13 + \beta25)$ | |

The calculated gradient is an unsigned integer which is compared to the appropriate edge threshold depending on the angle and the color data of the generation point. If the result of this first-level test indicates that an edge is on one of the diagonals, see FIGS. 7A and 7B, then a second-level test is performed which uses the previously synthesized red or blue color data at the blue or red sensed location. The equations (edge calculations) for the calculation of the gradients (edge measures) used in the second-level test are shown in Table 5.

TABLE 5

| Edge Measure | Edge Calculation | GTT Adaptive Threshold |
|---|---|---|
| DG1 | $abs(G12 - G18)$ | $(G8 + G12 + G14 + G18)/SF + GEPTH$ |
| DG2 | $abs(G8 - G14)$ | |
| DG3 | $abs(G12 - G8)$ | |
| DG4 | $abs(G8 - G14)$ | |
| D$\alpha$135 | $abs(\alpha7 - 2 * \alpha13 + \alpha19)$ | None |
| D$\alpha$45 | $abs(\alpha9 - 2 * \alpha13 + \alpha17)$ | None |

Green Channel Synthesis Equations

The synthesis of green color data uses one of eight interpolation kernels depending on the outcome of the first-level edge test and, where appropriate, the first-level and the second-level edge tests. Table 6 describes the eight interpolation kernels used for synthesis of the green color data.

TABLE 6

| Group Name | | Interpolation Kernel |
|---|---|---|
| I | $Gs13_{AVG4}$ | $\dfrac{(G_8 + G_{12} + G_{14} + G_{18})}{4}$ |
| II | $Gs13_{AVG4xy}$ | $\dfrac{(G_{12} + G_{14} + G_8 + G_{18})}{4} - \dfrac{(\beta_3 - 2\cdot\beta_{13} + \beta_{23})}{8} - \dfrac{(\beta_{11} - 2\cdot\beta_{13} + \beta_{15})}{8}$ |
| | $Gs13_{0°}$ | $\dfrac{(G_{12} + G_{14})}{2} - \dfrac{(\beta_{11} - 2\cdot\beta_{13} + \beta_{15})}{4}$ |
| | $Gs13_{90°}$ | $\dfrac{(G_8 + G_{18})}{2} - \dfrac{(\beta_3 - 2\cdot\beta_{13} + \beta_{23})}{4}$ |
| III | $Gs13_{45°}$ | $\dfrac{(G_{12} + G_{14} + G_8 + G_{18})}{4} - \dfrac{(\alpha_7 - 2\cdot\alpha_{13} + \alpha_{19})}{4}$ |
| | $Gs13_{135°}$ | $\dfrac{(G_{12} + G_{14} + G_8 + G_{18})}{4} - \dfrac{(\alpha_{17} - 2\cdot\alpha_{13} + \alpha_9)}{4}$ |
| IV | $Gsb13_{0°}$ | $\dfrac{(G_{12} + G_{14} + G_8 + G_{18})}{4} - \dfrac{(\beta_{11} - 2\cdot\beta_{13} + \beta_{15})}{4}$ |

The Group I interpolation kernel is based off of simple bilinear interpolation. It does not use any gradient correction because it is associated with a homogeneous region, and assuming that a "no edge" region is accurately detected, an improved signal to noise ratio is available without gradient correction terms.

The Group II interpolation kernels are bilinear interpolation with a cross-channel Laplacian applied parallel to the interpolation direction.

The Group III interpolation kernels are based off of the average of the green color data at the four locations with a cross-channel gradient correction based on the previously synthesized blue or red color data. The gradient correction in this case is applied perpendicular to the detected edge direction and a second-level test is employed.

The Group IV interpolation kernels are based off of the average of the green color data at the four locations with a cross-channel gradient correction in the direction of the detected edge. The selection of the best kernel to use is based on using the four-element boolean code word in conjunction with a lookup table as described in the next section.

Green Channel Interpolation Kernel Lookup Table

Lookup Table 7 for the green channel is broken into nine groups. Of the nine groups, four represent an immediate selection of an interpolation kernel and the remaining five indicate that a second-level test is to be performed before selection of the interpolation kernel.

TABLE 7

| Group | Code Word | 2nd Level Edge Test | Interpolation Kernel |
|---|---|---|---|
| 1 | NEEE, NEEN, NENE, NENN | None | $Gs13_{0°}$ |
| 2 | ENEE, ENEN, ENNE, ENNN | None | $Gs13_{90°}$ |
| 3 | NNNN | None | $Gs13_{AVG4}$ |
| 4 | NNEE | None | $Gs13_{AVG4xy}$ |
| 5 | EENN | D0° < D90° | $Gsb13_{0°}$ |
| | | D0° > D90° | $Gsb13_{90°}$ |
| | | D0° = D90° | $Gs13AVG4xy$ |
| 6 | NNEN, NNNE | $D\alpha45° > D\alpha135°$ | $Gs13_{135°}$ |
| | | $\alpha a45° < D\alpha135°$ | $Gs13_{45°}$ |
| | | $D\alpha45° = D\alpha135°$ | $Gs13_{AVG4xy}$ |

TABLE 7-continued

| Group | Code Word | 2nd Level Edge Test | Interpolation Kernel |
|---|---|---|---|
| 7 | EEEN | IF(DG1 < GTT && DG2 < GTT) | $Gs13_{45°}$ |
| | | ELSE IF (D0° < D90°) | $Gsb13_{0°}$ |
| | | ELSE IF (D0° > D90°) | $Gsb13_{90°}$ |
| | | ELSE (D0° = D90°) | $Gs13_{AVG4xy}$ |
| 8 | EENE | IF(DG3 < GTT && DG4 < GTT) | $Gs13_{45°}$ |
| | | ELSE IF (D0° < D90°) | $Gsb13_{0°}$ |
| | | ELSE IF (D0° > D90°) | $Gsb13_{90°}$ |
| | | ELSE (D0° = D90°) | $Gs13_{AVG4xy}$ |
| 9 | EEEE | if min = D0° | $Gs13_{0°}$ |
| | | if min = D90° | $Gs13_{90°}$ |
| | | if min = D45° | $Gs13_{AVG4xy}$ |
| | | ELSE | $Gs13_{AVG4xy}$ |

Generation of Red and Blue Color Data at Locations Having Green Color Data

Figure 8:
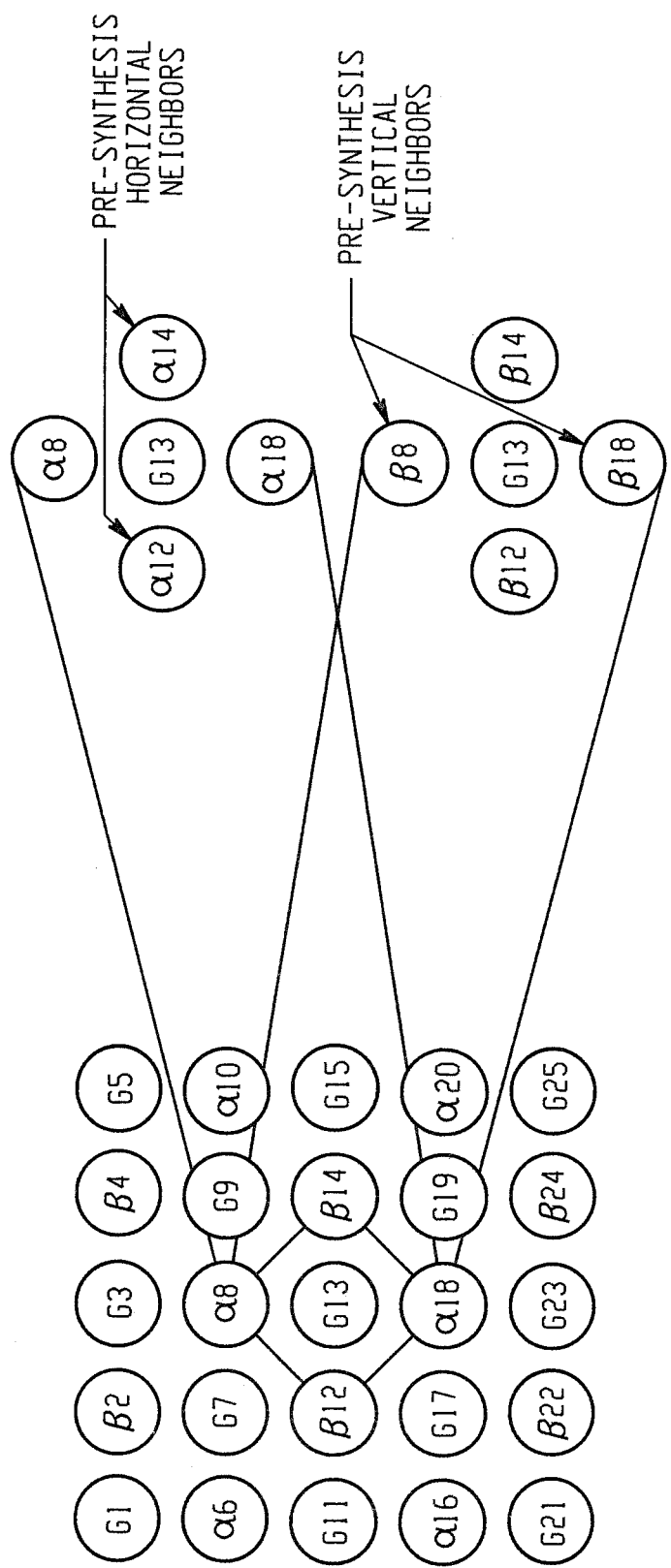
FIG. 8 illustrates the neighbor presynthesis goal for blue and red color data centered on sensed green color data in a red/green or green/blue row.

The generation of red and blue color data at locations where green sensed color data is available is also accomplished using a 5×5 window. The synthesis of the red and blue color data at locations where green sensed color data is available is based on the same method used for synthesis of the green color data. Because locations for sensing red and blue color data are half as many as the locations used to sense green color data within the Bayer array, an additional step is used. In this additional step, a presynthesis of the color data of either the vertical or horizontal neighbors is performed. FIG. 8 illustrates the neighbor presynthesis goal for blue and red color data centered on sensed green color data in a red/green or blue/green row, respectively.

The synthesis of the color data of the horizontal and vertical neighbor locations of the generation point is accomplished using 4 presynthesis kernels. The east and west presynthesis kernels are based off of the color data surrounding locations $\beta 12$ and $\beta 14$ in FIG. 8. Similarly, the north and south presynthesis kernels are based off of the color data surrounding locations $\alpha 8$ and $\alpha 18$ in FIG. 8.

Red/Blue Presynthesis of the Color Data at the Horizontal Neighbor Locations

The presynthesis of the color data of the horizontal neighbor locations provides for the synthesis of the blue color data at the locations east and west of the generation point when the generation point is on a red/green row and the red color data at the locations east and west of the generation point when the generation point is on a blue/green row. The kernel used to presynthesize the missing color data uses the neighboring sensed color data in a 4×5 matrix centered on the color data at locations β12 and β14. The method is similar to the green channel synthesis described in the previous section and is based on the calculation of gradients at 0°, 45°, 90°, and 135°. The steps involved in the presynthesis operation are:

calculation of on-angle gradients at 0°, 45°, 90°, and 135°;

evaluation of the cross-channel gradients against edge/noise thresholds;

using the resulting four-element boolean code word to select an interpolation kernel; and using the selected interpolate kernel to generate the missing color data.

Figure 9:
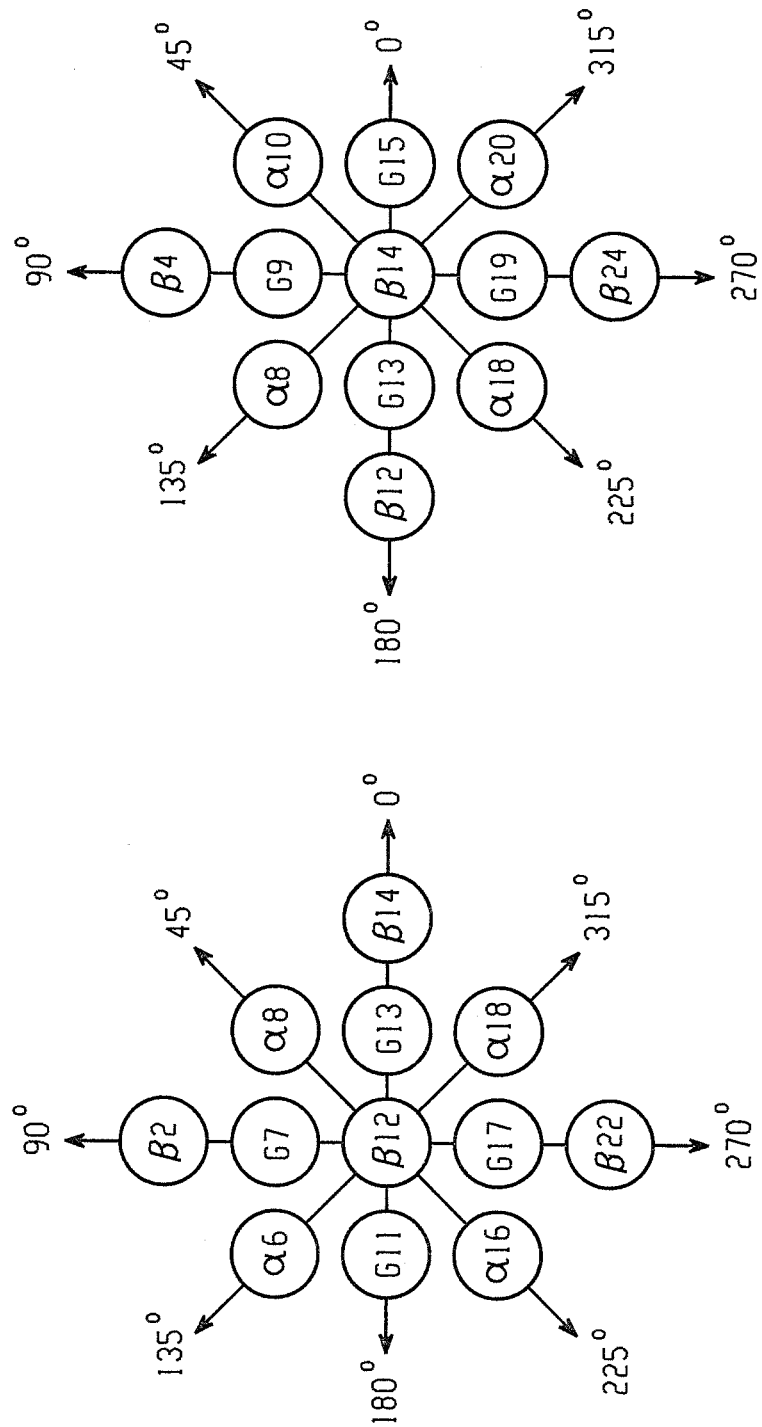
FIG. 9 illustrates the color data involved in the presynthesis of color data at neighboring locations east and west of the generation point.

FIG. 9 illustrates the color data involved in the presynthesis of color data at neighboring locations east and west of the generation point.

Horizontal Neighbors Edge Discrimination

For horizontal neighbor edge discrimination, the gradient calculations are based off a single channel for the angles at 0°, 45° and 135° because there are limited color data available at those angles. The gradient calculation at 90° is based off of a cross-channel gradient. Table 8 illustrates the equations (edge calculations) for the calculation of the gradients (edge measures) and the equations for the calculation of the thresholds.

TABLE 8

| Edge Measure | Location | Edge Calculation | GTT Adaptive Threshold |
|---|---|---|---|
| D0° | WEST | abs(G11 − G13) | (G7 + G11 + G13 + G17)/SF + GEPTH |
|  | EAST | abs(G15 − G13) | (G9 + G13 + G15 + G19)/SF + GEPTH |
| D90° | WEST | abs(G7 − G17) + abs(β2 − 2 * β12 + β22) | (G7 + G11 + G13 + G17)/SF + GTβ1 |
|  | EAST | abs(G9 − 19) + abs(β4 − 2 * β14 + β24) | (G9 + G13 + G15 + G19)/SF + GTβ1 |

TABLE 8-continued

| Edge Measure | Location | Edge Calculation | GTT Adaptive Threshold |
|---|---|---|---|
| D45° | WEST | abs(α8 − α16) | (α6 + α8 + α16 + α18)/SF + αEPTH |
|  | EAST | abs(α18 − α10) | (α8 + α10 + α18 + α20)/SF + αEPTH |
| D135° | WEST | abs(α6 − α18) | (α6 + α8 + α16 + α18)/SF + αEPTH |
|  | EAST | abs(α20 − α8) | (α8 + α10 + α18 + α20)/SF + αEPTH |

The gradient is an unsigned integer which is compared to the appropriate edge threshold depending on the angle and the color of the generation point. The second-level edge test is used to aid in the selection of the interpolation kernel. Table 9 illustrates the horizontal second-level cross-channel edge test and describes the east and west second-level edge tests.

TABLE 9

| Edge Measure | West | East |
|---|---|---|
| Ds0 | abs(G11 − G13) + abs(β12 − β14) | abs(G15 − G13) + abs(β12 − β14) |
| Ds90 | abs(G11 − G13) + abs(β12 − 2 * β12 + β11) | abs(G9 − G19) + abs(β4 − 2 * β14 + β24) |

The second-level edge test results are compared to each other and are used to make a final selection of an interpolation kernel.

East/West Red/Blue Presynthesis Interpolation kernels

The east/west presynthesis uses one of six interpolation kernels depending on the outcome of the edge tests. Table 10 describes the eight interpolation kernels for the red or blue color data to be synthesized at the location west of the generation point.

TABLE 10

| Group | Name | Interpolation Kernel |
|---|---|---|
| I | $\alpha s12_{45°}$ | $\frac{(\alpha_8 + \alpha_{16})}{2}$ |
|  | $\alpha s12_{AVG4}$ | $\frac{(\alpha_6 + \alpha_8 + \alpha_{16} + \alpha_{18})}{4}$ |
|  | $\alpha s12_{135°}$ | $\frac{(\alpha_6 + \alpha_{18})}{2}$ |
| II | $\alpha s12_{0°}$ | $\frac{(\alpha_6 + \alpha_8 + \alpha_{16} + \alpha_{18}) - (G_7 + G_{17} - (G_{11} + G_{13}))}{4}$ |
|  | $\alpha s12_{90°}$ | $\frac{(\alpha_6 + \alpha_8 + \alpha_{16} + \alpha_{18}) - (\beta_2 - 2 \cdot \beta_{12} + \beta_{22})}{4}$ |
|  | $\alpha s12_{AVG4xy}$ | $\frac{(\alpha_6 + \alpha_8 + \alpha_{16} + \alpha_{18})}{4} - \frac{(\beta_2 - 2 \cdot \beta_{12} + \beta_{22})}{8} - \frac{(G_7 + G_{17} - (G_{11} + G_{13}))}{8}$ |

The Group I kernels are a simple average with no gradient correction and the Group II kernels are based off of the average of the four color data points with a gradient correction term. The east interpolation kernels follow the same structure as the west interpolation kernels. Table 11 illustrates the interpolation kernels for the red or blue color data at the location east of the generation point.

TABLE 11

| Group | Name | Interpolation Kernel |
|---|---|---|
| I | $\alpha s14_{45°}$ | $\dfrac{(\alpha_{18} + \alpha_{10})}{2}$ |
| | $\alpha s14_{AVG4}$ | $\dfrac{(\alpha_8 + \alpha_{10} + \alpha_{20} + \alpha_{18})}{4}$ |
| | $\alpha s14_{135°}$ | $\dfrac{(\alpha_8 + \alpha_{20})}{2}$ |
| II | $\alpha s14_{0°}$ | $\dfrac{(\alpha_{10} + \alpha_{20} + \alpha_8 + \alpha_{18})}{4} - \dfrac{(G_9 + G_{19} - (G_{13} + G_{15}))}{4}$ |
| | $\alpha s14_{90°}$ | $\dfrac{(\alpha_8 + \alpha_{10} + \alpha_{20} + \alpha_8) - (\beta_4 - 2 \cdot \beta_{14} + \beta_{24})}{4}$ |
| | $\alpha s14_{AVG4xy}$ | $\dfrac{(\alpha_8 + \alpha_{10} + \alpha_{20} + \alpha_{18})}{4} - \dfrac{(\beta_4 - 2 \cdot \beta_{14} + \beta_{24})}{8} - \dfrac{(G_9 + G_{19} - (G_{13} + G_{15}))}{8}$ |

East/West Red/Blue Presynthesis Interpolation Kernel Lookup Table

The east/west red and blue interpolation kernel lookup table is broken into seven groups. Of the seven groups, six represent an immediate selection of an interpolation kernel and the remaining one employs a second-level test prior to selecting the kernel to use for synthesis.

TABLE 12

| Group | Code Word | 2nd Level Edge Test | East Kernel | West Kernel |
|---|---|---|---|---|
| 1 | NNNN | None | $\alpha s12_{AVG4}$ | $\alpha s14_{AVG4}$ |
| 2 | NEEE, NEEN, NENE, NENN | None | $\alpha s12_{0°}$ | $\alpha s14_{90°}$ |
| 3 | ENEE, ENEN, ENNN, ENNE | None | $\alpha s12_{90°}$ | $\alpha s14_{0°}$ |
| 4 | EENE | None | $\alpha s12_{45°}$ | $\alpha s14_{45°}$ |
| 5 | EEEN | None | $\alpha s12_{135°}$ | $\alpha s14_{135°}$ |
| 6 | EENN, NNEE, NNEN, NNNE | D0 < D90 | $\alpha s12_{0°}$ | $\alpha s14_{0°}$ |
| | | D0 > D90 | $\alpha s12_{90°}$ | $\alpha s14_{90°}$ |
| | | D0 = D90 | $\alpha s12_{AVG4xy}$ | $\alpha s14_{AVG4xy}$ |
| 7 | EEEE | None | $\alpha s12_{AVG4xy}$ | $\alpha s14_{AVG4xy}$ |

Red/Blue Presynthesis of the Color Data at the Vertical Neighbor Locations

The presynthesis of the color data at the vertical neighbor locations provides for the synthesis of the blue color data at the locations north and south of the generation point when the generation point is on a blue/green row and the generation of red color data at the locations north and south of the generation point when the generation point is on a red/green row. The kernel used to presynthesize the missing color data uses the neighboring sensed color data in a 5×4 matrix centered on the color data at locations $\alpha 8$ and $\alpha 18$. The method is similar to the green channel synthesis described above and is based on the calculation of gradients at 0°, 45°, 90°, and 135°. The steps involved in the presynthesis operation are:

calculation of on-angle gradients at 0°, 45°, 90°, and 135°;
evaluation of the cross-channel gradients against edge/noise thresholds;
using the resulting four-element boolean code word to select an interpolation kernel; and
using the selected interpolate kernel to generate the missing color data.

Figure 10:
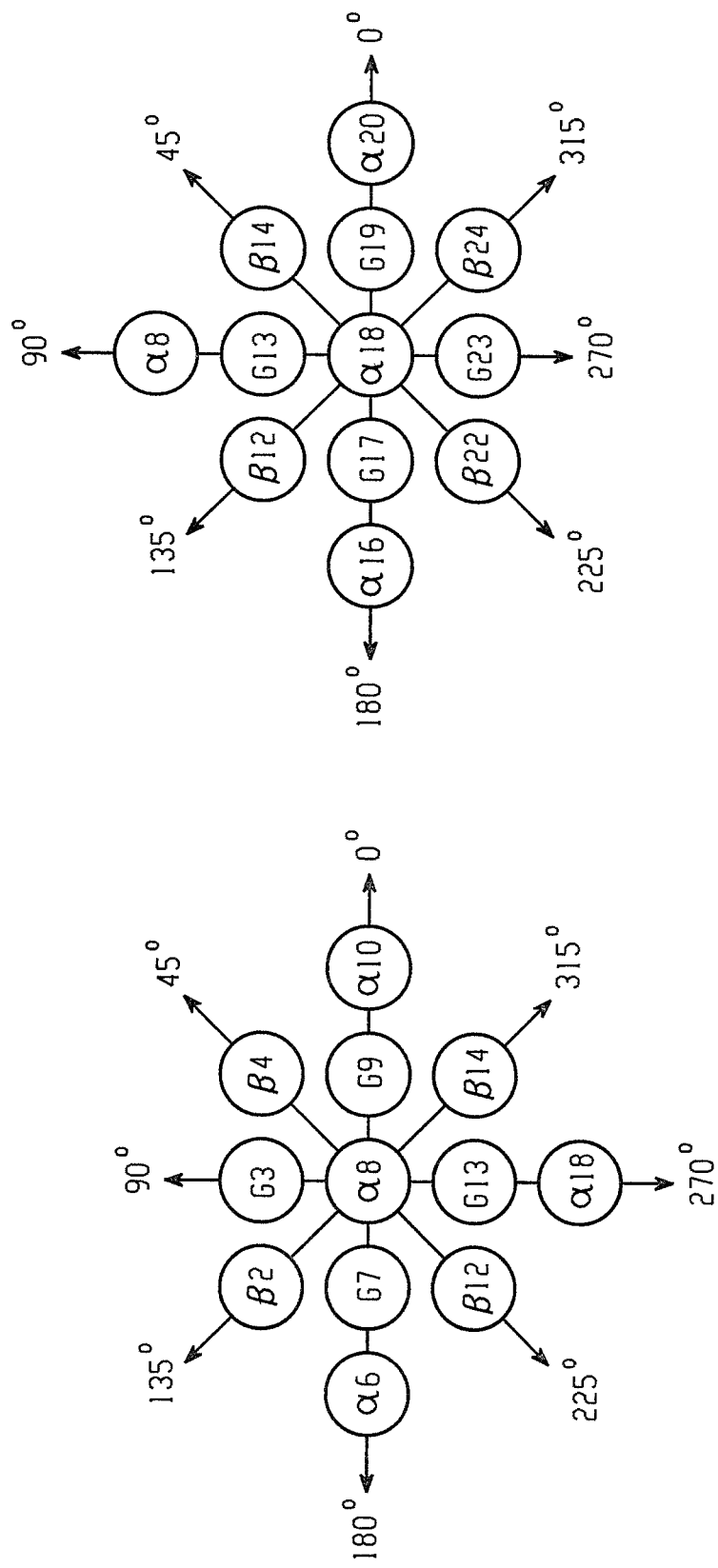
FIG. 10 illustrates the color data involved in the presynthesis of color data at neighboring locations north and south of the generation point.

FIG. 10 illustrates the color data used in the presynthesis of color data at neighboring locations north and south of the generation point.

Vertical Neighbors Edge Discrimination

The gradient calculations are based off a single channel for the angles at 0°, 45°, and 135° because there are limited color data available at those angles. The gradient calculation at 90° is based off of a cross-channel gradient. Table 13 illustrates the equations (edge calculations) for the calculation of the gradients (edge measures) and the equations for the calculation of the thresholds.

TABLE 13

| Edge Measure | Location | Edge Calculation | GTT Adaptive Threshold |
|---|---|---|---|
| D0° | North | abs(G7 − G9) + abs($\alpha 6 - 2 * \alpha 8 + \alpha 10$) | (G3 + G7 + G9 + G13)/ SF + GT$\alpha$0 |
| | South | abs(G17 − G19) − abs($\alpha 16 - 2 * \alpha 18 + \alpha 20$) | (G17 + G19 + G23 + G13)/SF + GT$\alpha$0 |
| D90° | North | abs(G3 − G13) | (G3 + G7 + G9 + G13)/ SF + GEPTH |
| | South | abs(G13 − G23) | (G17 + G19 + G23 + G13)/SF + GEPTH |
| D45° | North | abs(($\beta 4 - \beta 12$)) | ($\beta 2 + \beta 4 + \beta 12 + \beta 14$)/ SF + $\beta$EPTH |
| | South | abs($\beta 14 - \beta 22$) | ($\beta 12 + \beta 14 + \beta 22 + \beta 24$)/ SF + $\beta$EPTH |
| D135° | North | abs($\beta 2 - \beta 14$) | ($\beta 2 + (\beta 4 + \beta 12 + \beta 14)$/ SF + $\beta$epth |
| | South | abs($\beta 12 - \beta 24$) | ($\beta 12 + \beta 14 + \beta 22 + \beta 24$)/ SF + $\beta$EPTH |

The gradient is an unsigned integer which is compared to the appropriate edge threshold depending on the angle and the color of the generation point. The second-level edge test is used to aid in the selection of an interpolation kernel. Table 14 illustrates the vertical second-level cross-channel edge test and describes the north and south second-level edge tests.

TABLE 14

| Edge Measure | North | South |
|---|---|---|
| Ds0 | abs(G7 − G9) + abs($\alpha_6$ − 2 * $\alpha_8$ + $\alpha_{10}$) | abs(G17 − G19) + abs($\alpha_{16}$ − 2 * $\alpha_{18}$ + $\alpha_{20}$) |
| Ds90 | abs(G3 − G13) + abs($\alpha_8$ + $\alpha_{18}$) | abs(G13 − G23) + abs($\alpha_8$ + $\alpha_{18}$) |

The second-level edge test results are compared to each other and are used to make a final selection of an interpolation kernel.

North/South Red/Blue Presynthesis Interpolation Kernels

The north/south presynthesis uses one of six interpolation kernels depending on the outcome of the edge tests. Table 15 describes the six interpolation kernels for the red or blue color data to be synthesized at the location to the north of the generation point.

TABLE 15

| | Group Name | Interpolation Kernel |
|---|---|---|
| I | $\beta s8_{45°}$ | $\dfrac{(\beta_4 + \beta_{12})}{2}$ |
| | $\beta s8_{AVG4}$ | $\dfrac{(\beta_2 + \beta_4 + \beta_{12} + \beta_{14})}{4}$ |
| | $\beta s8_{135°}$ | $\dfrac{(\beta_2 + \beta_{14})}{2}$ |
| II | $\beta s8_{0°}$ | $\dfrac{(\beta_2 + \beta_4 + \beta_{12} + \beta_{14}) - (\alpha_6 - 2 \cdot \alpha_8 + \alpha_{10})}{4}$ |
| | $\beta s8_{90°}$ | $\dfrac{(\beta_2 + \beta_4 + \beta_{12} + \beta_{14}) - (G_7 + G_9 - (G_{13} + G_3))}{4}$ |
| | $\beta s8_{AVG4xy}$ | $\dfrac{(\beta_2 + \beta_4 + \beta_{12} + \beta_{14})}{4} - \dfrac{(\alpha_6 - 2 \cdot \alpha_8 + \alpha_{10})}{8} - \dfrac{(G_7 + G_9 - (G_{13} + G_3))}{8}$ |

The Group I kernels are based off of a simple average of the color data from the four locations surrounding the generation point using diagonal interpolations and the average four. The Group II kernels are based off of the average of the color data from the four locations with a gradient correction term.

Table 16 illustrates the interpolation kernels for the red and blue color data at the locations south of the generation point.

TABLE 16

| | Group Name | Interpolation Kernel |
|---|---|---|
| I | $\beta s18_{45°}$ | $\dfrac{(\beta_{14} + \beta_{22})}{2}$ |
| | $\beta s18_{AVG4}$ | $\dfrac{(\beta_2 + \beta_4 + \beta_{12} + \beta_{14})}{4}$ |
| | $\beta s18_{135°}$ | $\dfrac{(\beta_{12} + \beta_{24})}{2}$ |
| II | $\beta s18_{0°}$ | $\dfrac{(\beta_{12} + \beta_{14} + \beta_{22} + \beta_{24}) - (\alpha_{16} - 2 \cdot \alpha_{18} + \alpha_{20})}{4}$ |
| | $\beta s18_{90°}$ | $\dfrac{(\beta_{12} + \beta_{14} + \beta_{22} + \beta_{24}) - (G_{17} + G_{19} - (G_{13} + G_{23}))}{4}$ |
| | $\beta s18_{xy}$ | $\dfrac{(\beta_{12} + \beta_{14} + \beta_{22} + \beta_{24})}{4} - \dfrac{(\alpha_{16} - 2 \cdot \alpha_{18} + \alpha_{20})}{8} - \dfrac{(G_{17} + G_{19} - (G_{13} + G_{23}))}{8}$ |

North/South Red/Blue Presynthesis Interpolation Kernel Lookup Table

The north/south red and blue interpolation lookup table is broken into seven groups. Of the seven groups, six represent an immediate selection of an interpolation kernel, and the remaining one employs a second-level test prior to selecting the kernel to use for the synthesis.

TABLE 17

| Vector | Code Word | 2nd Level Edge Test | North Kernel | South Kernel |
|---|---|---|---|---|
| 1 | NNNN | None | $\beta 8_{AVG4}$ | $\beta s18_{AVG4}$ |
| 2 | NEEE, NEEN, NENE, NENN | None | $\beta s8_{0°}$ | $\beta s18_{90°}$ |
| 3 | ENEE, ENEN, ENNN, ENNE | None | $\beta s8_{90°}$ | $\beta s18_{0°}$ |
| 4 | EENE | None | $\beta s8_{45°}$ | $\beta s18_{45°}$ |
| 5 | EEEN | None | $\beta s8_{135°}$ | $\beta s18_{135°}$ |
| 6 | EENN, NNEE, NNEN, NNNE | D0 < D90 | $\beta s8_{0°}$ | $\beta s18_{90°}$ |
|   |   | D0 > D90 | $\beta s8_{90°}$ | $\beta s18_{0°}$ |
|   |   | D0 = D90 | $\beta s8_{AVG4xy}$ | $\beta s18_{AVG4xy}$ |
| 7 | EEEE | None | $\beta s8_{AVG4xy}$ | $\beta s18_{AVG4xy}$ |

Red/Blue Synthesis at Locations Having Green Color Data

Figure 11:
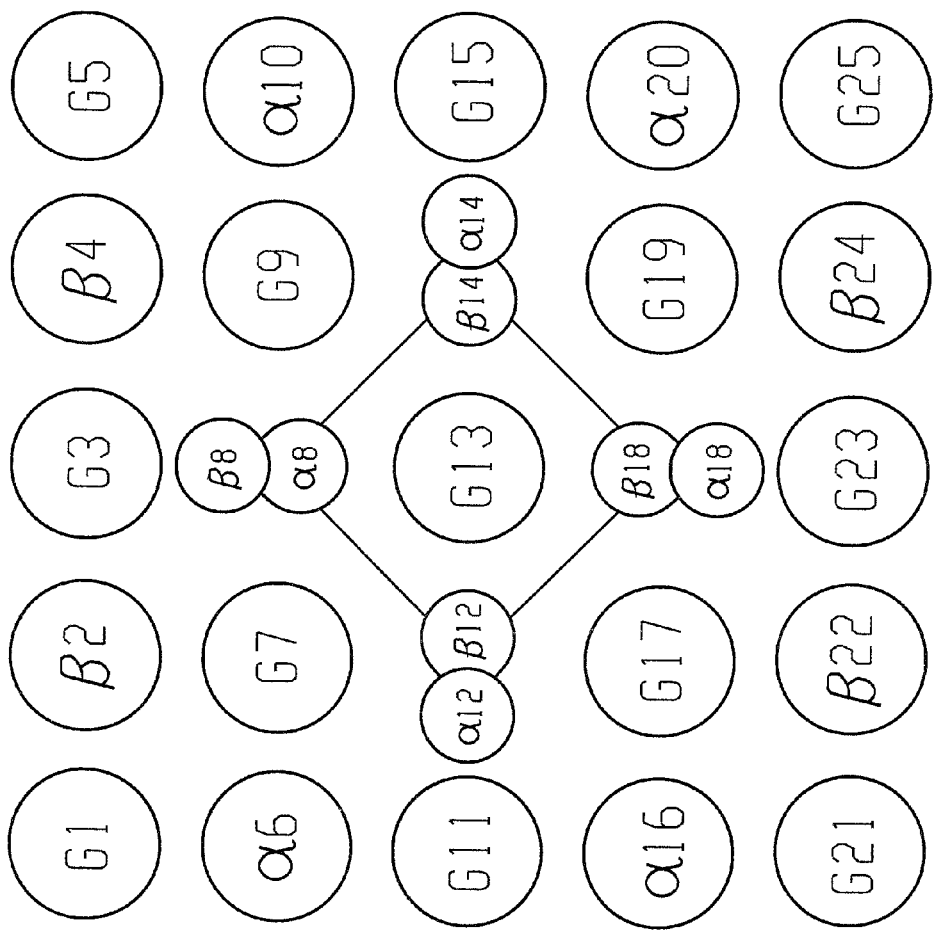
FIG. 11 illustrates a 5×5 window (frame or matrix) surrounding a location which is a generation point at which green color data has been sensed or measured and now blue or red color data is to be synthesized for the generation point.

Following the presynthesis of the color values at the locations of the neighbors of the generation point, red and blue color data is now available for the locations immediately neighboring the generation point 13 illustrated in FIG. 11. FIG. 11 illustrates a 5×5 window (frame or matrix) surrounding a location which is a generation point at which green color data has been sensed or measured and now blue or red color data is to be synthesized for the generation point.

The disclosed gradient vector method when applied to the synthesis of red and blue color data at locations where green color data is sensed provides the same edge discrimination, signal-level noise adaptation, and use of a boolean code word as discussed above for the green channel. The presynthesis of the color data at the locations that neighbor the generation point both east/west and north/south as just described allows the color data present within a 5×5 window to be effectively propagated into the synthesized red or blue color data. There are some differences in the kernels applied to the red/blue synthesis at locations where green data is sensed when compared to the green channel synthesis. This is primarily due to the subsampled nature of the red and blue planes within the Bayer array. The following sections describe the generation of the red and blue color data at locations where green color data is sensed following the presynthesis of the color data of the locations immediately adjacent to the generation point.

Red/Blue Channel on Green Edge Discrimination

The equations (edge calculations) for the calculation of the cross-channel gradients (edge measures) are provided in Table 18 as are the equations for the thresholds.

TABLE 18

| Edge Measure | Edge Calculation | Synthesis | STT Adaptive Threshold |
|---|---|---|---|
| D0° | Abs($\beta 12 - \beta 14$) + abs(G11 − 2 * G13 + G15) | R on G | ($\beta 12 + \beta 14 + \beta 8 + \beta 18$)/SF + RTG0 |
|   |   | B on G | ($\beta 12 + \beta 14 + \beta 8 + \beta 18$)/SF + BTG0 |
| D90° | Abs($\alpha 8 - \alpha 18$) + abs(G3 − 2 * G13 + G23) | R on G | ($\alpha 12 + \alpha 14 + \alpha 8 + \alpha 18$)/SF + RTG1 |
|   |   | B on G | ($\alpha 12 + \alpha 14 + \alpha 8 + \alpha 18$)/SF + BTG1 |
| D45° | Abs(G9 − 2 * G13 + G17) | R on G | (G7 + G9 + G17 + G19)/SF + RTG2 |
|   |   | B on G | (G7 + G9 + G17 + G19)/SF + BTG2 |
| D135° | Abs(G7 − 2 * G13 + G19) | R on G | (G7 + G9 + G17 + G19)/SF + RTG3 |
|   |   | B on G | (G7 + G9 + G17 + G19)/SF + BTG3 |

Figure 12:
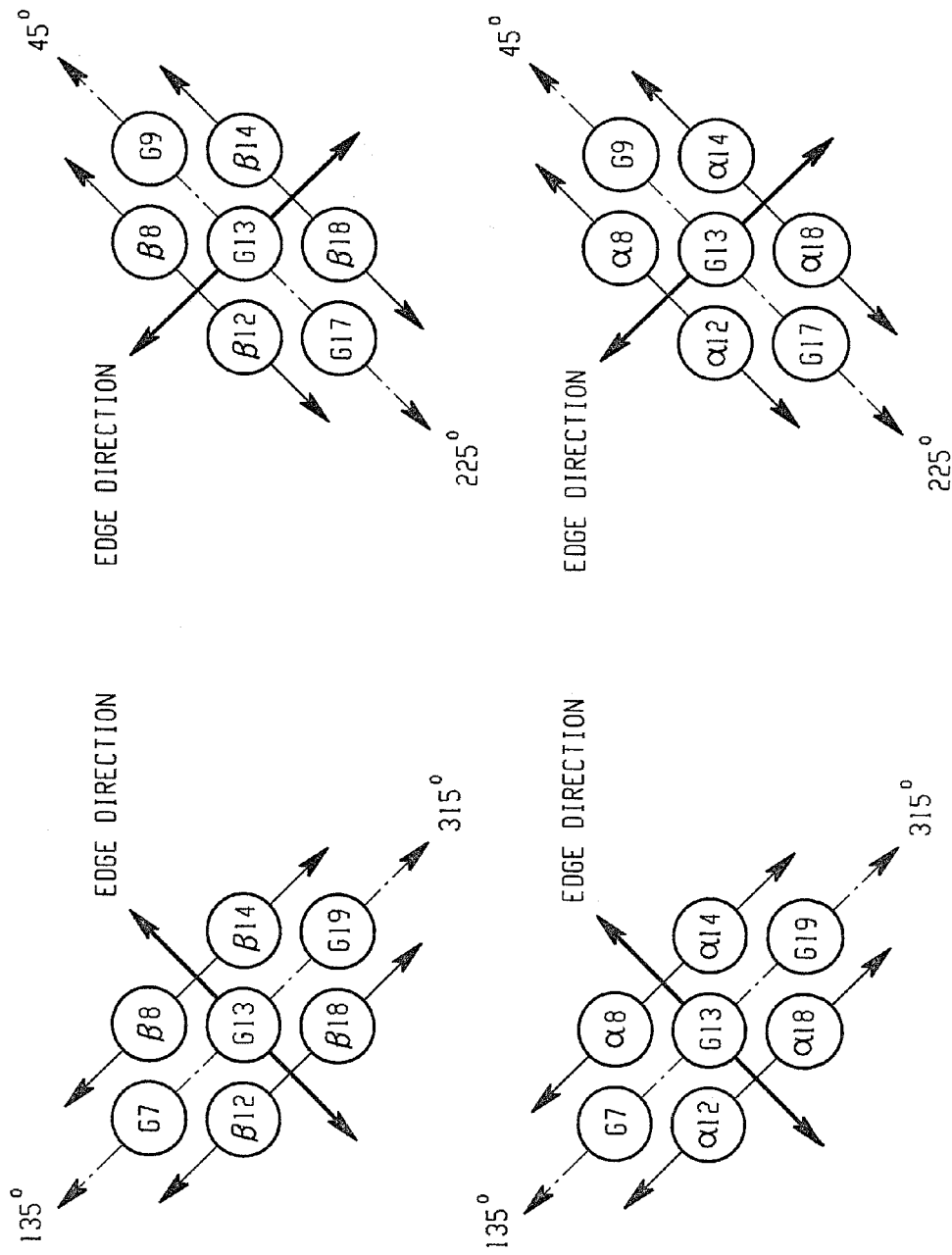
FIG. 12 illustrates the case when red/blue color data is being synthesized at a location at which green color data is sensed or measured, and the first-level test indicates that an edge may be present along one of the diagonals.

The calculated gradient is a 10-bit or 12-bit unsigned integer clamped in the range [0, 1023] or [0, 4095] for 10-bit or 12-bit precision of the Bayer data, respectively. The calculated gradient is compared to the appropriate edge threshold depending on the angle and the color data at the generation point. If the result of this first-level test indicates than an edge is on one of the diagonals, see FIG. 12, then a second-level test is performed which uses the previously presynthesized red or blue color data at the blue or red sensed location.

The second-level gradient calculations are compared to the noise thresholds in a similar fashion as described previously. Table 19 identifies the calculations (β-edge calculations) for the calculation of the gradients (edge measures) and the equations for calculating the corresponding noise thresholds.

TABLE 19

| Edge Measure | β - Edge Calculation | GTT Adaptive Threshold |
|---|---|---|
| Dβ1 | abs($\beta 12 - \beta 18$) | ($\beta 12 + \beta 18 + \beta 8 + \beta 14$)/SF + βEPTH |
| Dβ2 | abs($\beta s8 - \beta 14$) | ($\beta 12 + \beta 18 + \beta 8 + \beta 14$)/SF + βEPTH |
| Dβ3 | abs($\beta 12 - \beta 8$) | ($\beta 12 + \beta 18 + \beta 8 + \beta 14$)/SFF + βEPTH |
| Dβ4 | abs($\beta s18 - \beta 14$) | ($\beta 12 + \beta 18 + \beta 8 + \beta 14$)/SF + βEPTH |
| Dα1 | abs($\alpha 12 - \alpha 18$) | ($\alpha 12 + \alpha 18 + \alpha 8 + \alpha 14$)/SF + αEPTH |
| Dα2 | abs($\alpha 8 - \alpha s14$) | ($\alpha 12 + \alpha 18 + \alpha 8 + \alpha 14$)/SF + αEPTH |
| Dα3 | abs($\alpha 12 - \alpha 8$) | ($\alpha 12 + \alpha 18 + \alpha 8 + \alpha 14$)/SF + αEPTH |
| Dα4 | abs($\alpha 18 - \alpha s14$) | ($\alpha 12 + \alpha 18 + \alpha 8 + \alpha 14$)/SF + αEPTH |
| DG135 | abs(G7 − 2 * G13 + G19) | None |
| DG45 | abs(G9 − 2 * G13 + G17) | None |

Red/Blue on Green Synthesis Equations

The synthesis of red and blue color data uses one of nine interpolation kernels depending on the outcome of the first-level edge test and, where appropriate, the first-level and the second-level edge tests. Table 20 describes the nine interpolation kernels for the β interpolation, and Table 21 describes the nine interpolation kernels for the α interpolation.

TABLE 20

| Group Name | | Interpolation Kernel |
|---|---|---|
| I | $\beta s13_{AVG4xy}$ | $\dfrac{(\beta_{12} + \beta_{14} + \beta s_8 + \beta s_{18})}{4} - \dfrac{(G_7 - 2 \cdot G_{13} + G_{19})}{8} - \dfrac{(G_{17} - 2 - \cdot G_{13} + G_9)}{8}$ |
|   | $\beta s13_{0°}$ | $\dfrac{(\beta_{12} + \beta_{14})}{2} - \dfrac{(G_{11} - 2 \cdot G_{13} + G_{15})}{4}$ |
|   | $\beta s13_{90°}$ | $\dfrac{(\beta s_8 + \beta s_{18})}{2} - \dfrac{(G_3 - 2 \cdot G_{13} + G_{23})}{4}$ |

TABLE 20-continued

| Group | Name | Interpolation Kernel |
|---|---|---|
| II | $\beta s13_{45°}$ | $\frac{(\beta_{12} + \beta_{14} + \beta s_8 + \beta s_{18})}{4} - \frac{(G_7 - 2 \cdot G_{13} + G_{19})}{4}$ |
|  | $\beta s13_{135°}$ | $\frac{(\beta_{12} + \beta_{14} + \beta s_8 + \beta s_{18})}{4} - \frac{(G_{17} - 2 \cdot G_{13} + G_9)}{4}$ |
| III | $\beta s13_{22.5°}$ | $\frac{(\beta_{12} + \beta_{14})}{2} - \frac{(G_{11} - 2 \cdot G_{13} + G_{15})}{8} - \frac{(G_{17} - 2 \cdot G_{13} + G_9)}{8}$ |
|  | $\beta s13_{337.5°}$ | $\frac{(\beta_{12} + \beta_{14})}{2} - \frac{(G_{11} - 2 \cdot G_{13} + G_{15})}{8} - \frac{(G_7 - 2 \cdot G_{13} + G_{19})}{8}$ |
|  | $\beta s13_{67.5°}$ | $\frac{(\beta s_8 + \beta s_{18})}{2} - \frac{(G_3 - 2 \cdot G_{13} + G_{23})}{8} - \frac{(G_7 - 2 \cdot G_{13} + G_{19})}{8}$ |
|  | $\beta s13_{112.5°}$ | $\frac{(\beta s_8 + \beta s_{18})}{2} - \frac{(G_3 - 2 \cdot G_{13} + G_{23})}{8} - \frac{(G_{17} - 2 \cdot G_{13} + G_9)}{8}$ |

TABLE 21

| Group | Name | Interpolation Kernel |
|---|---|---|
| I | $\alpha s13_{AVG4xy}$ | $\frac{(\alpha s_{12} + \alpha s_{14} + \alpha_8 + \alpha_{18})}{4} - \frac{(G_7 - 2 \cdot G_{13} + G_{19})}{8} - \frac{(G_{17} - 2 \cdot G_{13} + G_9)}{8}$ |
|  | $\alpha s13_{0°}$ | $\frac{(\alpha s_{12} + \alpha s_{14})}{2} - \frac{(G_{11} - 2 \cdot G_{13} + G_{15})}{4}$ |
|  | $\alpha s13_{90°}$ | $\frac{(\alpha s_8 + \alpha s_{18})}{2} - \frac{(G_3 - 2 \cdot G_{13} + G_{23})}{4}$ |
| II | $\alpha s13_{45°}$ | $\frac{(\alpha s_{12} + \alpha s_{14} + \alpha_8 + \alpha_{18})}{4} - \frac{(G_7 - 2 \cdot G_{13} + G_{19})}{4}$ |
|  | $\alpha s13_{135°}$ | $\frac{(\alpha s_{12} + \alpha s_{14} + \alpha_8 + \alpha_{18})}{4} - \frac{(G_{17} - 2 \cdot G_{13} + G_9)}{4}$ |
| III | $\alpha s13_{22.5°}$ | $\frac{(\alpha s_{12} + \alpha s_{14})}{2} - \frac{(G_{11} - 2 \cdot G_{13} + G_{15})}{8} - \frac{(G_{17} - 2 \cdot G_{13} + G_9)}{8}$ |
|  | $\alpha s13_{337.5°}$ | $\frac{(\alpha s_{12} + \alpha s_{14})}{2} - \frac{(G_{11} - 2 \cdot G_{13} + G_{15})}{8} - \frac{(G_7 - 2 \cdot G_{13} + G_{19})}{8}$ |
|  | $\alpha s13_{67.5°}$ | $\frac{(\alpha_8 + \alpha_{18})}{2} - \frac{(G_3 - 2 \cdot G_{13} + G_{23})}{8} - \frac{(G_7 - 2 \cdot G_{13} + G_{19})}{8}$ |
|  | $\alpha s13_{112.5°}$ | $\frac{(\alpha_8 + \alpha_{18})}{2} - \frac{(G_3 - 2 \cdot G_{13} + G_{23})}{8} - \frac{(G_7 - 2 \cdot G_{13} + G_9)}{8}$ |

The Group I interpolation kernels are based off of simple bilinear interpolation. These kernels are applied when the edge has been either clearly identified as horizontal or vertical or if it is clearly a homogeneous region.

The Group II interpolation kernels are based off of simple bilinear interpolation with a cross-channel Laplacian applied parallel to the interpolation direction.

The Group III interpolation kernels are based off of the average of the green color data at four locations with a cross-channel gradient correction based on the previously synthesized blue or red color data. The gradient correction in this case is applied perpendicular to the detected edge direction and a second-level edge test is employed.

The Group IV interpolation equations are used when an edge has been detected in each of the on-angle tests at 0°, 90°, 45°, and 135°, the EEEE condition. In this case, the minimum pair will isolate the angle at 22.5°, 67.5°, 112.5°, or 152.5°.

Interpolation Kernel Lookup Table for Red/Blue Synthesis at Locations Having Green Color Data Lookup Table 22 for the red/blue channels is broken into seven groups. Of the seven groups, three represent an immediate selection of an interpolation kernel and the remaining four employ a second-level test prior to selecting the interpolation kernel.

TABLE 22

| Vector Group | Code Word | β - Kernel 2nd Level Edge Test | β - Kernel | α - Kernel 2nd Level Edge Test | α - Kernel |
|---|---|---|---|---|---|
| 1 | NNNN, NNEE | None | $\beta s13_{AVG4xy}$ | None | $\alpha s13_{AVG4xy}$ |
| 2 | NEEN, NENE, NENN, NEEE | None | $\beta s13_{0°}$ | None | $\alpha s13_{0°}$ |
| 3 | ENEN, ENNE, ENNN, ENEE | None | $\beta s13_{90°}$ | None | $\alpha s13_{90°}$ |
| 4 | EENN, NNEN, NNNE | DG45° < DG135° ELSE | $\beta s13_{45°}$ $\beta s13_{135°}$ | DG45° < DG135° ELSE | $\alpha s13_{45°}$ $\alpha s13_{135°}$ |
| 5 | EEEN | IF (Dβ1 < GTT && Dβ2 < GTT) ELSE IF (D0° < D90°) ELSE IF (D0° > D90°) ELSE (D0° = D90°) | $\beta s13_{45°}$ $\beta s13_{0°}$ $\beta s13_{90°}$ $\beta s13_{AVG4xy}$ | IF (Dα1 < GTT && Dα2 < GTT) ELSE IF (D0° < D90°) ELSE IF (D0° > D90°) ELSE (D0° = D90°) | $\alpha s13_{45°}$ $\alpha s13_{0°}$ $\alpha s13_{90°}$ $\alpha s13_{AVG4xy}$ |
| 6 | EENE | IF (Dβ2 < GTT && Dβ3 < GTT) ELSE IF (D0° < D90°) ELSE IF (D0° > D90°) ELSE (D0° = D90°) | $\beta s13_{45°}$ $\beta s13_{0°}$ $\beta s13_{90°}$ $\beta s13_{AVG4xy}$ | IF (Dα3 < GTT && Dα4 < GTT) ELSE IF (D0° < D90°) ELSE IF (D0° > D90°) ELSE (D0° = D90°) | $\alpha s13_{45°}$ $\alpha s13_{0°}$ $\alpha s13_{90°}$ $\alpha s13_{AVG4xy}$ |
| 7 | EEEE - min = D0° | IF (DG45° < DG135°) ELSE | $\beta s13_{22.5°}$ $\beta s13_{337.5°}$ | IF (DG45° < DG135°) ELSE | $\alpha s13_{22.5°}$ $\alpha s13_{337.5°}$ |
|  | EEEE - min = D90° | IF (DG45° < DG135°) ELSE | $\beta s13_{67.5°}$ $\beta s13_{112.5°}$ | IF (DG45° < DG135°) ELSE | $\alpha s13_{67.5°}$ $\alpha s13_{112.5°}$ |
|  | EEEE - min = D45° | None | $\beta s13_{AVG4xy}$ | None | $\alpha s13_{AVG4xy}$ |
|  | EEEE - min = D135° | None | $\beta s13_{AVG4xy}$ | None | $\alpha s13_{AVG4xy}$ |

Synthesis of Red/Blue Color Data at Locations Having Blue/Red Color Data

Figure 13:
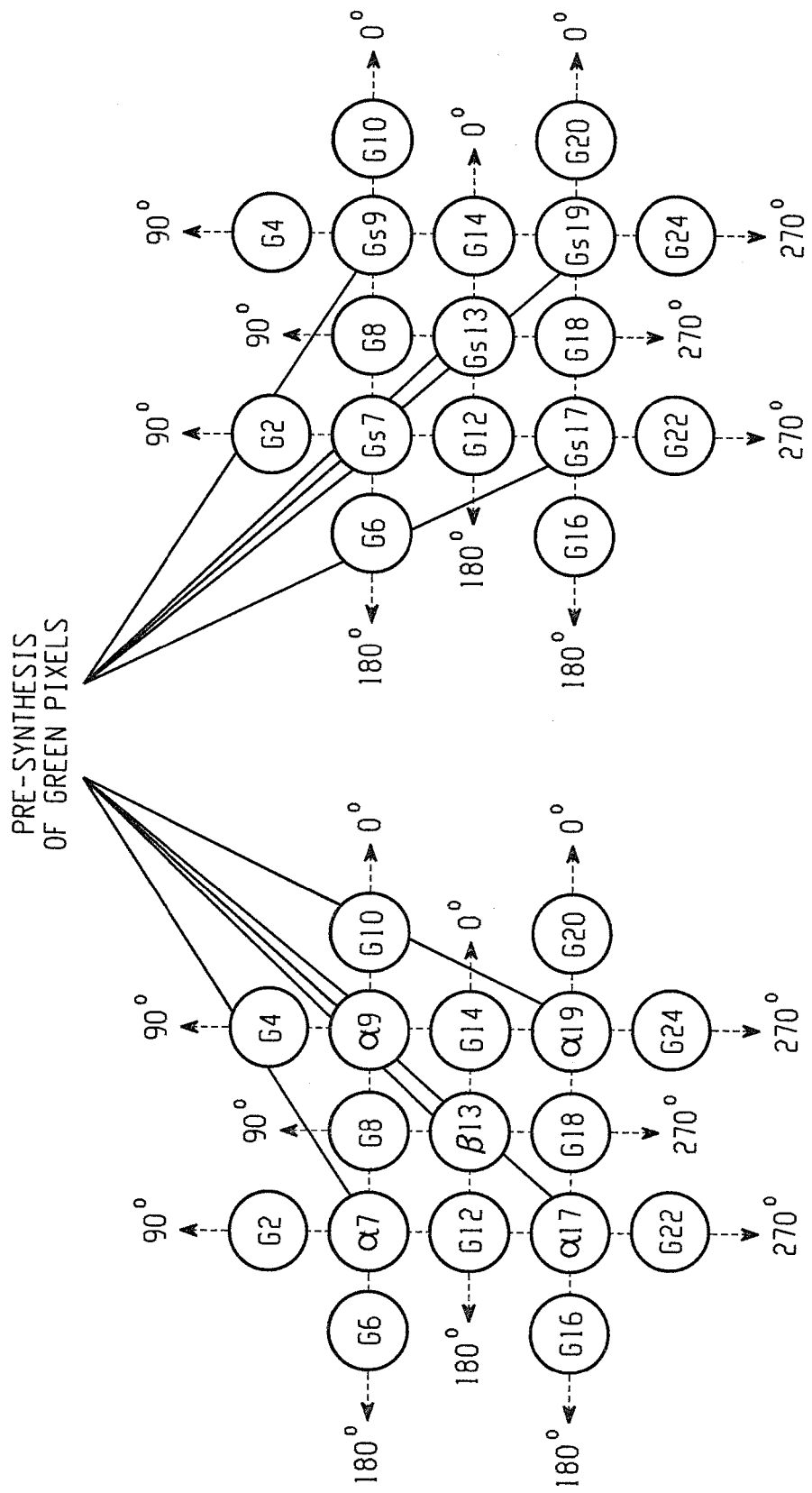
FIG. 13 illustrates a partial 5×5 window (frame or matrix) surrounding a location at which blue or red color data sensed or measured, and now green color data is to be presynthesized at the identified locations.

The synthesis of the red and blue color data at locations that sense blue and red colors, respectively, is performed using a presynthesis step followed by application of the disclosed gradient vector synthesis method. Referring to FIG. 13, the presynthesis of the green color data at locations α7, α9, β13, α17, and α19 within the 5×5 window is performed using a simple green channel edge preserving synthesis. The synthesis of either the blue or red color data is always performed prior to the synthesis of the green color data at the generation point.

Presynthesis of the Green Color Data for the Neighbors

The equations (edge calculations) for the calculation of the gradients (edge measures) and the equations for the thresholds for the presynthesis of the green color data for the diagonal neighbors with respect to the generation point are illustrated in Table 23.

TABLE 23

| Location | Measure Edge | Edge Calculations | GTT Adaptive Threshold |
|---|---|---|---|
| 7 | D0° | abs(G6 − G8) | (G2 + G8 + G6 + G12)/ SF + GEPTH |
|  | D90° | abs(G2 − G12) |  |
| 9 | D0° | abs(G8 − G10) | (G8 + G10 + G4 + G14)/ SF + GEPTH |
|  | D90° | abs(G4 − G14) |  |
| 17 | D0° | abs(G16 − G18) | (G16 + G18 + G12 + G22)/SF + GEPTH |
|  | D90° | abs(G12 − G22) |  |
| 19 | D0° | abs(G18 − G20) | (G18 + G20 + G14 + G24)/SF + GEPTH |
|  | D90° | abs(G14 − G24) |  |
| 13 | D0° | abs(G12 − G14) + abs(β11 − 2 * β13 + β15) | (G12 + G14 + G8 + G18)/SF + GTβ0 |
|  | D90° | abs(G8 − G18) + abs(β3 − 2 * β13 + β23) |  |

The gradients at 0° and 90° are compared to the adaptive edge threshold as with the previous synthesis descriptions, and the resulting four-element boolean code word is used to select the best interpolation kernel. Table 24 describes the interpolation kernels used for the presynthesis of the green color data for the neighbors diagonal to the generation point for synthesis of red and blue color data at locations sensing blue and red color data.

TABLE 24

| Location | Name | Interpolation Kernel |
|---|---|---|
| 7 | $Gs7_{0°}$ | (G2 + G12)/2 |
|  | $Gs7_{90°}$ | (G6 + G8)/2 |
|  | $Gs7_{AVG4}$ | (G6 + G8 + G2 + G12)/4 |
| 9 | $Gs9_{0°}$ | (G4 + G14)/2 |
|  | $Gs9_{90°}$ | (G8 + G10)/2 |
|  | $GS9_{AVG4}$ | (G8 + G10 + G4 + G14)/4 |
| 17 | $Gs17_{0°}$ | (G12 + G22)/2 |
|  | $Gs17_{90°}$ | (G16 + G18)/2 |
|  | $Gs17_{AvG4}$ | (G16 + G18 + G12 + G22)/4 |
| 19 | $Gs19_{0°}$ | (G14 + G24)/2 |
|  | $Gs19_{90°}$ | (G18 + G20)/2 |
|  | $Gs19_{AVG4}$ | (G14 + G24 + G18 + G20)/4 |
| 13 | $Gs13_{0°}$ | (G12 + G14)/2 + β11 − 2 * β13 + β15)/4 |
|  | $Gs13_{90°}$ | (G8 + G18)/2 + β3 − 2 * β13 + β23)/4 |
|  | $Gs13_{AvG4}$ | (G8 + G12 + G14 + G18)/4 + (β11 − 2 * β13 + β15)/4 + (β3 − 2 * β13 + β23)/4 |

The presynthesized color data follow a similar scheme as described in the previous sections except that only two directions are considered. For each of the locations, four possible edge states exist: NN, NE, EN, and EE. Selection of the interpolation kernel is straightforward for the "no edge" and the horizontal/vertical edge states. For the EE condition, a second-level test is performed prior to selecting the interpolation kernel to be used for the presynthesis of color data. Table 25 describes how the four-element boolean word is used in selecting the best interpolation kernel.

TABLE 25

| Location | Vector | Code Word | 2nd Level Edge Test | Interpolation Kernel |
|---|---|---|---|---|
| 7 | 1 | NN | None | $Gs7_{AVG4}$ |
|  | 2 | NE | None | $Gs7_{0°}$ |
|  | 3 | EN | None | $Gs7_{90°}$ |

TABLE 25-continued

| Location | Vector | Code Word | 2nd Level Edge Test | Interpolation Kernel |
|---|---|---|---|---|
| | | | $D0° > D90°$ | $Gs7_{90°}$ |
| | 4 | EE | $D0° < D90°$ | $Gs7_{0°}$ |
| | | | ELSE | $Gs7_{AVG4}$ |
| 9 | 1 | NN | None | $Gs9_{AVG4}$ |
| | 2 | NE | None | $Gs9_{0°}$ |
| | 3 | EN | None | $Gs9_{90°}$ |
| | | | $D0° > D90°$ | $Gs9_{90°}$ |
| | 4 | EE | $D0° < D90°$ | $Gs9_{0°}$ |
| | | | ELSE | $Gs9_{AVG4}$ |
| 17 | 1 | NN | None | $Gs17_{AVG4}$ |
| | 2 | NE | None | $Gs17_{0°}$ |
| | 3 | EN | None | $Gs17_{90°}$ |
| | | | $D0° > D90°$ | $Gs17_{90°}$ |
| | 4 | EE | $D0° < D90°$ | $Gs17_{0°}$ |
| | | | ELSE | $Gs17_{AVG4}$ |
| 19 | 1 | NN | None | $Gs19_{AVG4}$ |
| | 2 | NE | None | $Gs19_{0°}$ |
| | 3 | EN | None | $Gs19_{90°}$ |
| | | | $D0° > D90°$ | $Gs19_{90°}$ |
| | 4 | EE | $D0° < D90°$ | $Gs19_{0°}$ |
| | | | ELSE | $Gs19_{AVG4}$ |
| 13 | 1 | NN | None | $Gs13_{AVG4}$ |
| | 2 | NE | None | $Gs13_{0°}$ |
| | 3 | EN | None | $Gs13_{90°}$ |
| | | | $D0° > D90°$ | $Gs13_{90°}$ |
| | 4 | EE | $D0° < D90°$ | $Gs13_{0°}$ |
| | | | ELSE | $Gs13_{AVG4}$ |

Synthesis of Red/Blue Color Data at Locations Having Blue/Red Color Data

Following the presynthesis of the color data for the green neighbors of the generation point, green color data from five locations are available to refine the synthesis. The disclosed method proceeds in a similar fashion as described previously, i.e., the method is based off of the identification of the edge direction using the calculation of the cross-channel gradients at angles 0°, 90°, 45°, and 135°.

Red/Blue at Locations Sensing Blue/Red Edge Discrimination

The equations for the calculation of the cross-channel gradients (edge measures) and the noise thresholds are provided in Table 26.

TABLE 26

| Edge Measure | Edge Calculation | GTT Adaptive Threshold |
|---|---|---|
| D0° | $Abs(G12 - G14) + abs(\beta11 - 2 * \beta13 + \beta15)$ | $(G12 + G8 + G14 + G18)/SF + \alpha T\beta0$ |
| D90° | $Abs(G8 - G18) + abs(\beta3 - 2 * \beta13 + \beta23)$ | |
| D45° | $Abs(\alpha9 - \alpha17) + abs(\beta21 - 2 * \beta13 + \beta5)$ | $(\alpha9 + \alpha17 + \alpha7 + \alpha19)/SF + \alpha T\beta1$ |
| D135° | $Abs(\alpha7 - \alpha19) + abs(\beta1 - 2 * \beta13 + \beta25)$ | |

Figure 14B:
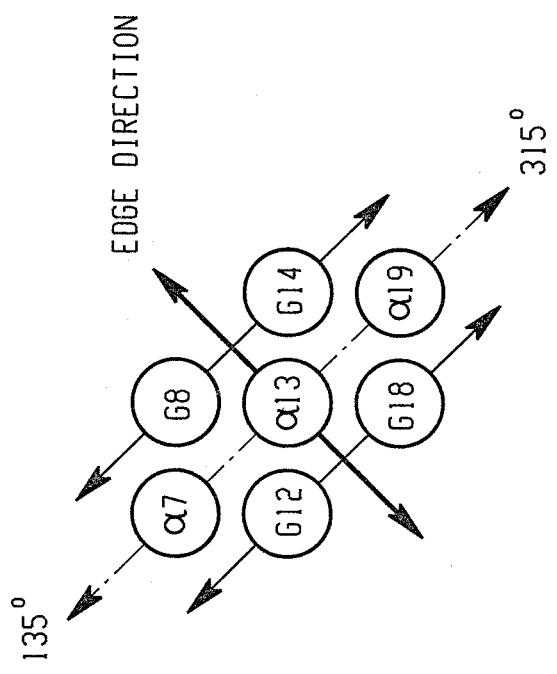
FIG. 14 illustrates the case when blue or red color data is being synthesized at a location at which red or blue color data is sensed or measured, and the first-level test indicates that an edge may be present along the 45° diagonal (FIG. 14A) or along the 135° diagonal (FIG. 14B).
Figure 14A:
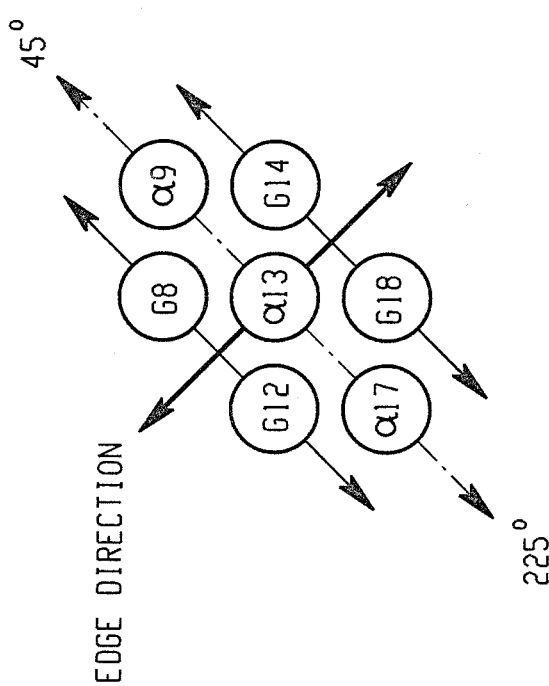
Figure 15:
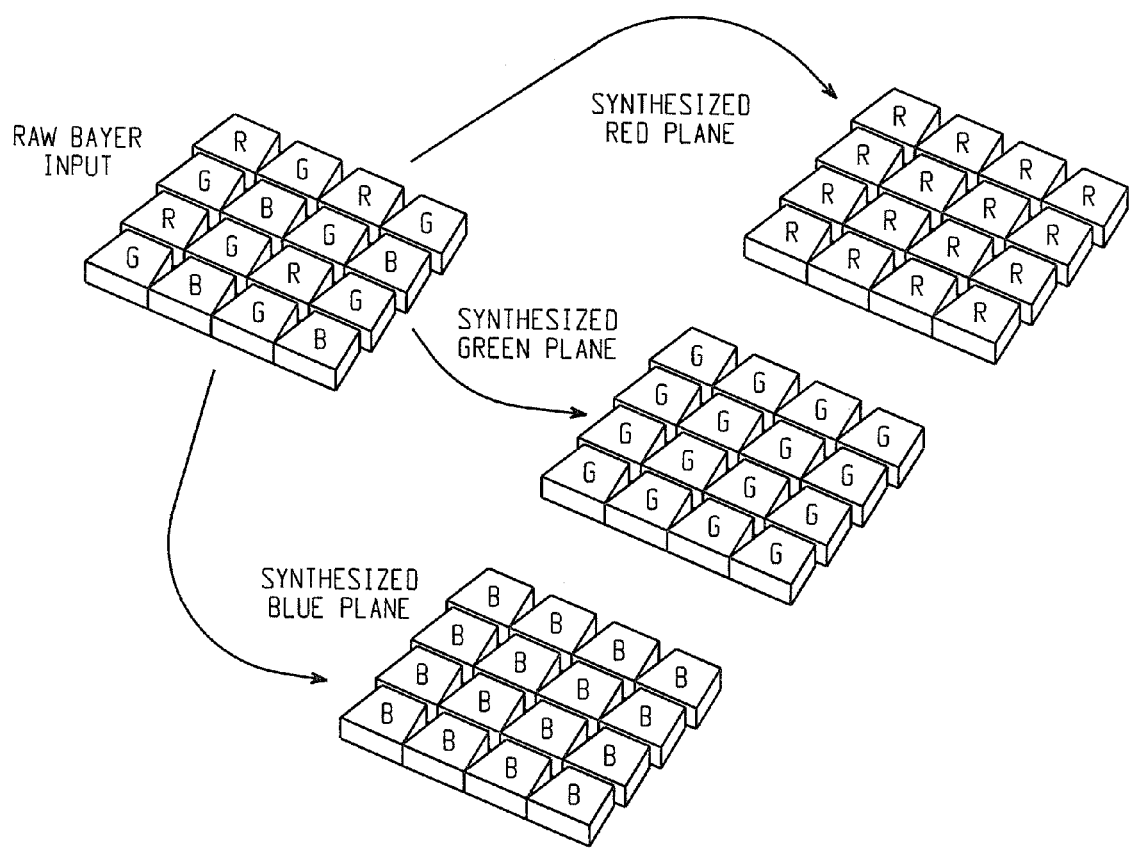
FIG. 15 illustrates the raw Bayer mosaic and the three panes comprised of both measured and synthesized color data.

The gradient is an unsigned integer which is compared to the appropriate edge threshold depending on the angle and the color data of the generation point. To refine the diagonal edge reproduction, a second-level test is made which uses the previously presynthesized red or blue color data at the blue or red sensed location. FIGS. 14A and 14B illustrate the second-level edge tests.

Similar to the previous channel synthesis descriptions, the second-level test is compared to the channel noise thresholds as shown in Table 27.

TABLE 27

| Edge Measure | Edge Calculation | GTT Adaptive Threshold |
|---|---|---|
| DG1 | $Abs(G12 - G18)$ | $(G8 + G12 + G14 + G18)/SF + GEPTH$ |
| DG2 | $Abs(G8 - G14)$ | $(G8 + G12 + G14 + G18)/SF + GEPTH$ |
| DG3 | $Abs(G12 - G8)$ | $(G8 + G12 + G14 + G18)/SF + GEPTH$ |
| DG4 | $Abs(G18 - G14)$ | $(G8 + G12 + G14 + G18)/SF + GEPTH$ |
| DGs135 | $Abs(Gs7 - 2 * Gs13 + Gs19)$ | None |
| DGs45 | $Abs(Gs9 - 2 * Gs13 + Gs17)$ | None |

Interpolation Kernels for Red/Blue Color Data Synthesis at Locations Sensing Blue/Red Color Data The red/blue color data synthesis uses a total of eleven interpolation kernels. The greater number of kernels is due primarily to the fact that we have only color data from four locations of the target color for synthesis available compared to the six available for the synthesis of red and blue color data at locations sensing green. Table 28 describes the interpolation kernels.

TABLE 28

| Group | Name | Interpolation Kernel |
|---|---|---|
| I | $\alpha s13_{AVG4xy}$ | $\frac{(\alpha_7 + \alpha_9 + \alpha_{17} + \alpha_{19})}{4} - \frac{(G_{12} - 2 \cdot G_{13} + G_{14})}{8} - \frac{(G_8 - 2 \cdot G_{13} + G_{18})}{8}$ |
| | $\alpha s13_{0°}$ | $\frac{(\alpha_7 + \alpha_9 + \alpha_{17} + \alpha_{19})}{4} - \frac{(G_8 - 2 \cdot G_{13} + G_{18})}{4}$ |
| | $\alpha s13_{90°}$ | $\frac{(\alpha_7 + \alpha_9 + \alpha_{17} + \alpha_{19})}{4} - \frac{(G_{21} - 2 \cdot G_{13} + G_{14})}{4}$ |
| II | $\alpha s13_{45°}$ | $\frac{(\alpha_{17} + \alpha_9)}{2} - \frac{(\beta_{21} - 2 \cdot \beta_{13} + \beta_5)}{4}$ |
| | $\alpha s13_{135°}$ | $\frac{(\alpha_7 + \alpha_{19})}{2} - \frac{(\beta_1 - 2 \cdot \beta_{13} + \beta_{25})}{4}$ |
| | $\alpha sd13_{AVG4xy}$ | $\frac{(\alpha_7 + \alpha_9 + \alpha_{17} + \alpha_{19})}{4} - \frac{(\beta_5 - 2 \cdot \beta_{13} + \beta_{21})}{8} - \frac{(\beta_1 - 2 \cdot \beta_{13} + \beta_{25})}{8}$ |
| | $\alpha sb13_{22.5°}$ | $\frac{(\alpha_7 + \alpha_9 + \alpha_{17} + \alpha_{19})}{4} - \frac{(\beta_3 - 2 \cdot \beta_{13} + \beta_{23})}{8} - \frac{(G_7 - 2 \cdot G_{13} + G_{19})}{8}$ |

TABLE 28-continued

| Group Name | Interpolation Kernel |
|---|---|
| III $\alpha sb13_{337.5°}$ | $\frac{(\alpha_7 + \alpha_9 + \alpha_{17} + \alpha_{19})}{4} - \frac{(\beta_3 - 2\cdot\beta_{13} + \beta_{23})}{8} - \frac{(G_9 - 2\cdot G_{13} + G_{17})}{8}$ |
| $\alpha sb13_{67.5°}$ | $\frac{(\alpha_7 + \alpha_9 + \alpha_{17} + \alpha_{19})}{4} - \frac{(\beta_{11} - 2\cdot\beta_{13} + \beta_{15})}{8} - \frac{(G_7 - 2\cdot G_{13} + G_{19})}{8}$ |
| $\alpha sb13_{122.5°}$ | $\frac{(\alpha_7 + \alpha_9 + \alpha_{17} + \alpha_{19})}{4} - \frac{(\beta_{11} - 2\cdot\beta_{13} + \beta_{15})}{8} - \frac{(G_9 - 2\cdot G_{13} + G_{17})}{8}$ |
| $\alpha sb13_{AVG4xy}$ | $\frac{(\alpha_7 + \alpha_9 + \alpha_{17} + \alpha_{19})}{4} - \frac{(\beta_3 - 2\cdot\beta_{13} + \beta_{23})}{8} - \frac{(\beta_{11} - 2\cdot\beta_{13} + \beta_{15})}{8}$ |

Interpolation Kernel Lookup Table for Red/Blue Color Data Synthesis at Locations Sensing Blue/Red Color Data Lookup Table 29 is broken into eight groups. Of the eight groups, four result in an immediate selection of an interpolation kernel. The remaining four use a second-level edge test prior to selecting the most appropriate kernel for synthesis.

TABLE 29

| Vector | Code Word | 2nd Level Edge Test | Interpolation Kernel |
|---|---|---|---|
| 1 | NNNN | None | $\alpha s13_{AVG4xy}$ |
| 2 | NEEE, NEEN, NENE, NENN | None | $\alpha s13_{0°}$ |
| 3 | ENEE, ENEN ENNE, ENNN | None | $\alpha s13_{90°}$ |
| 4 | NNEE | None | $\alpha sd13_{AVG4xy}$ |
| 5 | EENN, NNEN, NNNE | DGs45° > DGs135° | $\alpha s13_{135°}$ |
|  |  | ELSE | $\alpha s13_{45°}$ |
| 6 | EEEN | DG1 < GTT && DG2 < GTT | $\alpha s13_{135°}$ |
|  |  | ELSE | $\alpha s13_{45°}$ |
| 7 | EENE | DG3 < GTT && DG4 < GTT | $\alpha s13_{45°}$ |
|  |  | ELSE | $\alpha s13_{135°}$ |
| 8 | EEEE min D0° | DGs45° < DGs135° | $\alpha sb13_{22.5°}$ |
|  |  | ELSE | $\alpha sb13_{337.5°}$ |
|  | EEEE min D0° | DGs45° < DGs135° | $\alpha sb13_{67.5°}$ |
|  |  | ELSE | $\alpha sb13_{122.5°}$ |
|  | EEEE min D45° | None | $\alpha sb13_{AVG4xy}$ |
|  | EEEE min D135° | None | $\alpha sb13_{AVG4xy}$ |

CONCLUSION

Disclosed herein is a method and apparatus for the color synthesis of missing color data in the Bayer mosaic through what is referred to as a Gradient Vector Synthesis method. Although the present disclosure describes the method and apparatus in terms of a presently preferred embodiment, those of ordinary skill in the art will recognize that many modifications and variations are possible. For example, although a certain order of synthesis is preferred, the synthesis order may be modified or, in some cases, carried out in parallel. The following claims are intended to encompass all such modifications and variations.

It is claimed:

1. A method of synthesizing color data, the method comprising:
receiving a matrix of color data represented in a red-green-blue color space, said matrix of color data including more green color data than i) red color data and ii) blue color data;
presynthesizing missing neighbor color data with respect to a generation point in said matrix of color data when said generation point has the green color data;
calculating gradients at a plurality of angles with respect to said generation point in said matrix of color data;
performing a first-level edge test by comparing each of said gradients to a noise threshold;
determining whether a second-level edge test is required based on said comparing;
when no second-level edge test is required, i) performing no second-level edge test, and ii) selecting an interpolation technique in response to said comparing; and
when the second-level edge test is required, i) performing a second-level edge test based on one or more of said gradients, and ii) selecting the interpolation technique based on said comparing and said second-level edge test;
synthesizing missing color data at said generation point using said selected interpolation technique;
wherein the presynthesizing missing neighbor color data with respect to said generation point when said generation point has green color data includes:
when said generation point is on a red/green row of the matrix, then generating missing vertical neighbor red color data before synthesizing missing red color data at said generation point;
when said generation point is on the red/green row of the matrix, then generating missing horizontal neighbor blue color data before synthesizing missing blue color data at said generation point;
when said generation point is on a blue/green row of the matrix, then generating missing vertical neighbor blue color data before synthesizing missing blue color data at said generation point; and
when said generation point is on the blue/green row of the matrix, then generating missing horizontal neighbor red color data before synthesizing missing red color data at said generation point.

2. The method of claim 1, wherein said gradients are calculated at 0°, 45°, 90°, and 135°.

3. The method of claim 1, additionally comprising:
generating a boolean code word in response to whether each of the gradients is above or below said noise threshold; and
wherein said interpolation technique is selected based on said boolean code word.

4. The method of claim 1, additionally comprising:
if said color data at said generation point is red data, performing said method to synthesize missing blue and green data for said generation point; and if said color data at said generation point is blue data, performing said method to synthesize missing red and green data for said generation point.

5. The method of claim 1, wherein said presynthesizing comprises:
calculating additional gradients at said plurality of angles;
comparing each of said additional gradients to said noise threshold;
selecting an interpolation technique in response to said comparing; and
generating said missing vertical neighbor color data or missing horizontal neighbor color data using said selected interpolation technique.

6. The method of claim 5, wherein said additional gradients are calculated at 0°, 45°, 90°, and 135°.

7. The method of claim 1, wherein the first-level edge test performs comparisons involving all of the calculated gradients, and wherein the second-level edge test is based on fewer than all of the calculated gradients.

8. The method of claim 1, wherein when no second-level edge test is required, the selected interpolation technique is a bilinear interpolation technique or a bilinear interpolation technique that includes a cross-channel Laplacian applied parallel to a direction of interpolation.

9. The method of claim 8, wherein when a second-level edge test is required, the selected interpolation technique is the bilinear interpolation technique that includes the cross-channel Laplacian applied parallel to the direction of interpolation, an average of first color data at a plurality of locations with a cross-channel gradient correction based on presynthesized second color and third color data, or an average of the first color data at the plurality of locations with a cross-channel gradient correction in a direction of a detected edge.

10. A system for synthesizing color data, the system comprising:
a processor; and
a memory device in communication with said processor, said processor configured to:
receive a matrix of color data represented in a red-green-blue color space, said matrix of color data including more green color data than i) red color data and ii) blue color data;
presynthesize missing neighbor color data with respect to a generation point in said matrix of color data when said generation point has the green color data;
calculate gradients at a plurality of angles with respect to the generation point in the matrix of color data;
perform a first-level edge test by comparing each of said gradients to a noise threshold;
determine whether a second-level edge test is required based on said comparing;
when no second-level edge test is required, i) perform no second-level edge test, and ii) select an interpolation technique in response to said comparing; and
when the second-level edge test is required, i) perform a second-level edge test based on one or more of said gradients, and ii) select the interpolation technique based on said comparing and said second-level edge test;
synthesize missing color data at said generation point using said selected interpolation technique;
wherein for presynthesizing missing neighbor color data with respect to a generation point in said matrix of color data when said generation point has the green color data said processor is further configured to:
when said generation point is on a red/green row and has the green color data, then generate missing vertical neighbor red color data before synthesizing missing red color data at said generation point;
when said generation point is on the red/green row and has the green color data, then generate missing horizontal neighbor blue color data before synthesizing missing blue color data at said generation point;
when said generation point is on a blue/green row and has the green color data, then generate missing vertical neighbor blue color data before synthesizing missing blue color data at said generation point; and
when said generation point is on the blue/green row and has the green color data, then generate missing horizontal neighbor red color data before synthesizing missing red color data at said generation point.

11. The system of claim 10, wherein said gradients are calculated at 0°, 45°, 90°, and 135°.

12. The system of claim 10, wherein:
said processor is further configured to generate a boolean code word in response to whether each of the gradients is above or below said noise threshold; and
said interpolation technique is selected based on said boolean code word.

13. The system of claim 10, wherein:
if said color data at said generation point is red data, said processor is further configured to synthesize missing blue and green data for said generation point; and
if said color data at said generation point is blue data, said processor is further configured to synthesize missing red and green data for said generation point.

14. The system of claim 10, wherein said noise threshold is programmable.

15. The system of claim 10, wherein for presynthesizing missing neighbor color data with respect to said generation point in said matrix of color data when said generation point has green color data, said processor is further configured to:
calculate additional gradients at said plurality of angles;
compare each of said additional gradients to said noise threshold;
select an interpolation technique in response to said comparing; and
generate said missing vertical neighbor color data or missing horizontal neighbor color data using said selected interpolation technique.

16. The system of claim 15, wherein said additional gradients are calculated at 0°, 45°, 90°, and 135°.

* * * * *